United States Patent
Yildiz

(10) Patent No.: US 7,251,685 B1
(45) Date of Patent: *Jul. 31, 2007

(54) METHOD AND APPARATUS FOR DETAILED PROTOCOL ANALYSIS OF FRAMES CAPTURED IN AN IEEE 802.11(B) WIRELESS LAN

(75) Inventor: Kazim Orhan Yildiz, Wayne, NJ (US)

(73) Assignee: McAfee, Inc., Santa Clara, CA (US)

( * ) Notice: Subject to any disclaimer, the term of this patent is extended or adjusted under 35 U.S.C. 154(b) by 23 days.

This patent is subject to a terminal disclaimer.

(21) Appl. No.: 11/224,765

(22) Filed: Sep. 13, 2005

Related U.S. Application Data

(63) Continuation of application No. 10/026,261, filed on Dec. 21, 2001, now Pat. No. 7,016,948.

(51) Int. Cl.
*G06F 15/177* (2006.01)
*G06F 15/173* (2006.01)

(52) U.S. Cl. .................... 709/221; 709/224; 709/225

(58) Field of Classification Search ............... 709/221, 709/224, 225
See application file for complete search history.

(56) References Cited

U.S. PATENT DOCUMENTS

| | | | | |
|---|---|---|---|---|
| 6,393,484 | B1* | 5/2002 | Massarani | 709/227 |
| 6,693,888 | B2* | 2/2004 | Cafarelli et al. | 370/338 |
| 7,016,948 | B1* | 3/2006 | Yildiz | 709/221 |
| 2003/0055959 | A1* | 3/2003 | Sato | 709/224 |
| 2003/0101264 | A1* | 5/2003 | Yamada et al. | 709/225 |

* cited by examiner

*Primary Examiner*—John B. Walsh
(74) *Attorney, Agent, or Firm*—Zilka-Kotab, PC; Christopher J. Hamaty

(57) ABSTRACT

A system, method and computer program product are provided for identifying MAC addresses of known access points operating in an IEEE 802.11(b) wireless communication channel, checking addresses of detected access points against the addresses of the known access points, and identifying for display as a rogue access point any access point detected that is not included as a known access point.

20 Claims, 32 Drawing Sheets

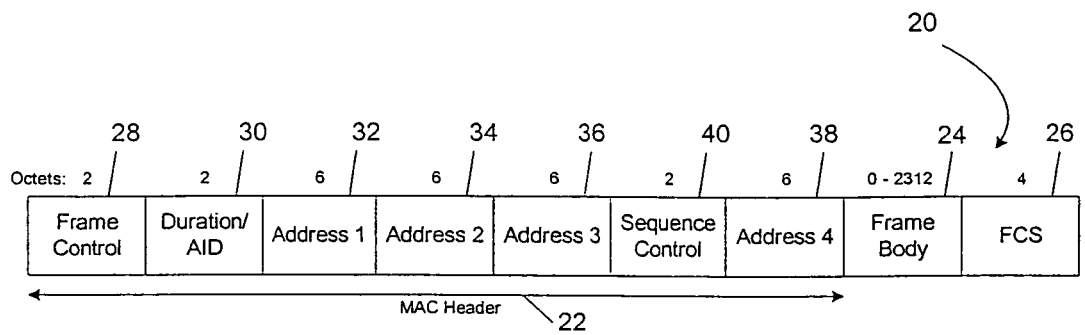
Figure 2A    (MAC Frame Format)
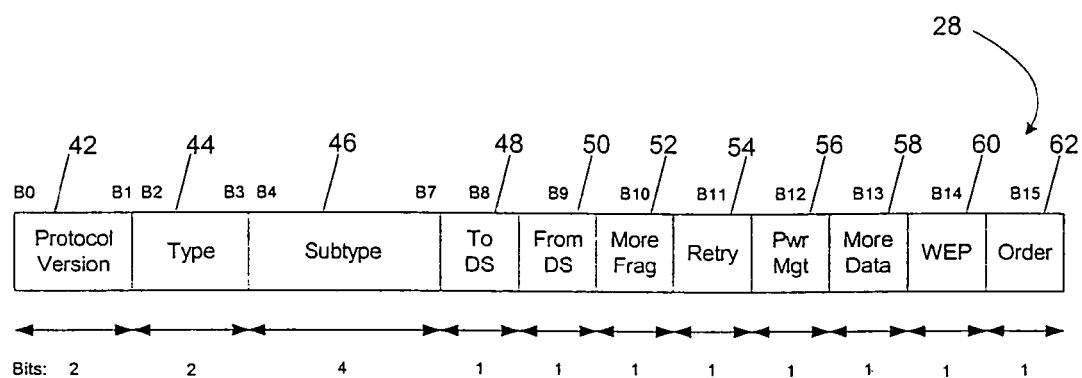
Figure 2B    (Frame Control Field)
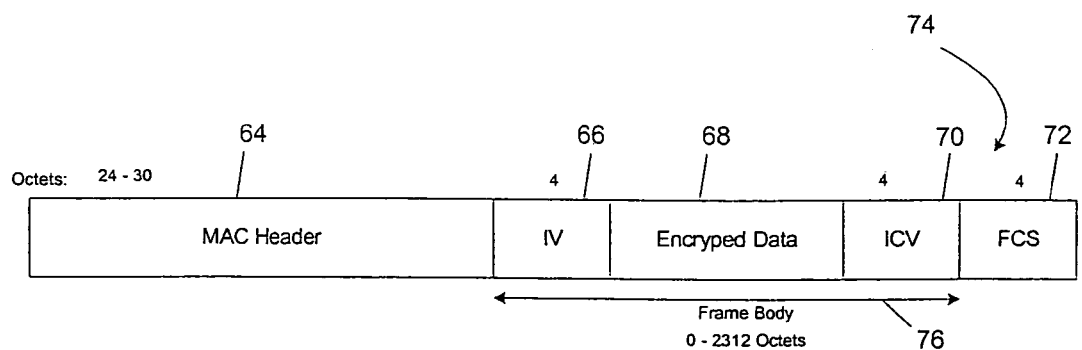
Figure 2C    (WEP Encrypted Frame Format)

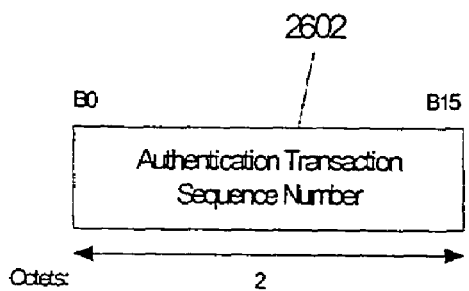
Figure 26A (Authentication Transaction Sequence Number Fixed Field)
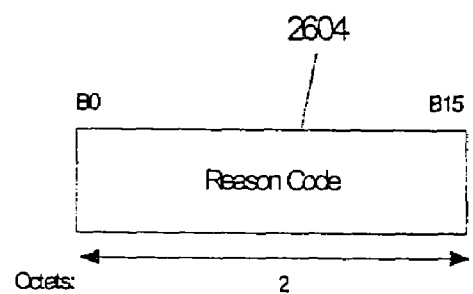
Figure 26B (Reason Code Fixed Field)
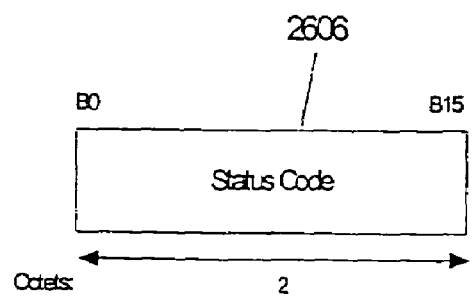
Figure 26C (Status Code Fixed Field)

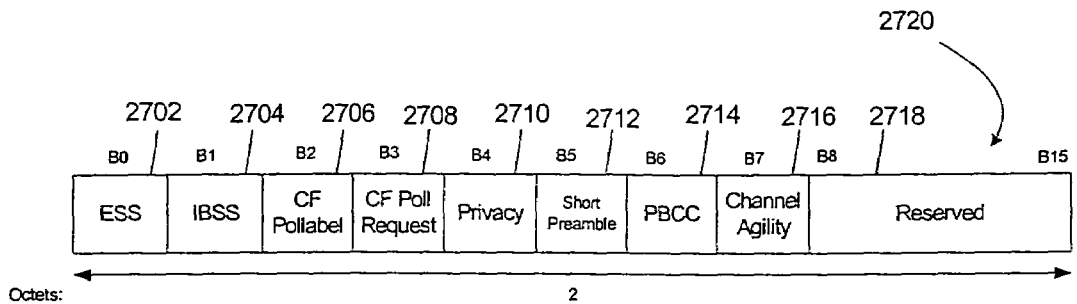
Figure 27A (Capability Information Fixed Field)
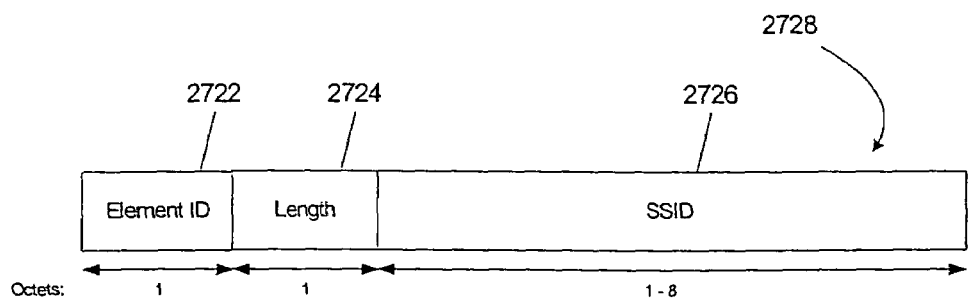
Figure 27B (SSID Information Element Format)
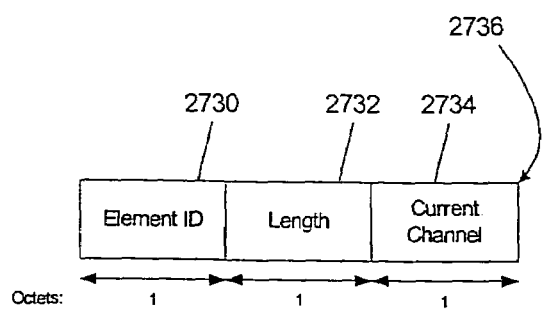
Figure 27C (DS Parameter Set Information Element Format)

METHOD AND APPARATUS FOR DETAILED PROTOCOL ANALYSIS OF FRAMES CAPTURED IN AN IEEE 802.11(B) WIRELESS LAN

This is a Continuation application Ser. No. 10/026,261 filed on Dec. 21, 2001 now U.S. Pat. No. 7,016,948, the disclosure of which is incorporated herein by reference.

RELATED APPLICATION

This Application is related to Ser. No. 09/954,389, filed Sep. 17, 2001, for "Decoding And Detailed Analysis of Captured Frames in An IEEE 802.11 (b) Wireless LAN," the teachings of which are incorporated herein to the extent that they do not conflict herewith. The related and present Applications have the same Assignee.

FIELD OF INVENTION

The present invention relates generally to computerized communication networks for permitting computers to communicate wirelessly with each other in an organized manner, and more particularly to a wireless network troubleshooting tool for detecting, diagnosing, and permitting repair of wireless network failures.

BACKGROUND OF THE INVENTION

Over the years, the wireless communication field enjoyed tremendous growth and popularity. Wireless technology now reaches or is capable of reaching nearly every place on the face of the earth. Hundreds of millions of people exchange information every day using pagers, cellular phones, and other wireless communication devices. With the success of wireless telephony and messaging services, wireless technology has also made significant inroads into the area of personal and business computing. Without the constraints imposed by wired networks, network users can move about almost without restriction and access a communication network from nearly any location, enabling wireless transmission of a variety of information types including data, video, voice and the like through the network.

Many different forms of data communication protocols have been developed for enabling computers to communicate with one another in an orderly manner. For example, several proprietary versions of wireless local area networks (LANs) were implemented for testing and development. One wireless network standard that was recently adopted by the wireless community is the IEEE802.11(b) LAN, which led to a surge in use of wireless LANs. The IEEE802.11(b) standard fixes specifications on the parameters of both the medium access control and the physical layers for enabling wireless connectivity between fixed, portable, and moving stations within a local area. The term "station" refers hereinafter to an active or passive device part of a computer network that is capable of communicating at least one data packet or frame within the computer network. Such stations include, but are not limited to, personal computers, servers, routers, printers, personal digital assistants, scanners and data collectors, palmtop computers, handheld PCs, pen-based computers, and the like.

According to the IEEE802.11(b) standard, the physical layer that handles transmission of data between stations, may utilize either direct sequence spread spectrum, frequency hopping spread spectrum, or infrared (IR) pulse position modulation. The medium access control layer (MAC) comprises a set of protocols that is responsible for maintaining order in the use of the shared medium. In accordance with the MAC protocol, when a station has a data packet or frame to be transmitted, it first listens to ensure no other station is transmitting. If the channel is clear, it then transmits the packet. Otherwise, it chooses a random "backoff factor" that determines the amount of time the station must wait until it is allowed to transmit the packet. During periods in which the channel is clear, the transmitting station decrements its backoff counter, and when the channel is busy it does not decrement its backoff counter. When the backoff counter reaches zero, then the station transmits the packet. Since the probability that two stations will choose the same backoff factor is small, collisions between packets are thus minimized. In certain environments, before a packet is to be transmitted, the transmitting station initially sends a short request-to-send (RTS) packet containing information on the length of the time required to transmit the packet. If the receiving station hears the RTS, it responds with a short clear-to-send (CTS) packet. After this exchange, the transmitting station sends its packet. When the packet is successfully received, as determined by a cyclic redundancy check (CRC), the receiving station transmits an acknowledgment (ACK) packet.

Like wired network counterparts, wireless networks may, during operation, encounter network difficulties or anomalies including, but not limited to, data traffic congestion at peak usage, point failures, and the like. Such network difficulties negatively impact network responsiveness and throughput. As a result, network users experience productivity loss, network processing delays and other disruptions. A measure of a network's performance is often referred to as the quality of service. Quality of service is typically measured by responsiveness, including the amount of time expended waiting for images, text, and other data to be transferred, and by throughput of data across a communications channel. Other aspects may be application-specific, for example, quality of playback, jitter, quality of the data transmitted over the communication channel, and the like. In order to troubleshoot, maintain, and optimize the performance of communication networks, the data traffic flowing through the communication channel is monitored, tested and analyzed to provide rapid detection, diagnosis and correction of network failure and system breakdown, through use of tools developed for this purpose. Network Associates, Inc., of Santa Clara, Calif., has been in the forefront of technology for many years in developing and providing software for managing and troubleshooting computer networks. The software is known as "Sniffere® Software."

In the course of testing and analyzing a network's quality of service, a network-monitoring tool is typically used to access a passive station positioned at a point or node along a wired network connection or communication channel through which all of the data traffic of interest streams. By accessing the passive station with the network-monitoring tool, all the data traffic passing through the corresponding network connection may be easily tracked and observed. Any irregularities in the data traffic flow may then be readily detected and analyzed to determine the source of a particular anomaly. This type of analysis is referred to as promiscuous mode analysis. Such wired network analysis techniques, however, cannot monitor data traffic transmitted over wireless communication channels. In network systems where wireless and wired networks are connected, the monitoring tool accessing the passive station of the wired network portion would fail to perceive any of the data traffic transmitted along the wireless portion of the network.

For the foregoing reasons, there is a need to provide network analysis tools with a method for extracting data packets or frames transmitted in a network such as between wireless stations, or between wireless stations and access points in a wireless LAN and performing an Expert Analysis that provides a detailed problem analysis on the contents of the data packets or frames, including associated protocol layers, and subsequent displaying of the results of this analysis to the user. This enables the user to better detect and pinpoint the sources of the network anomalies in a precise and efficient manner during the course of maintaining, troubleshooting, and optimizing the network's quality of service.

SUMMARY OF INVENTION

The present invention is generally directed to a method of performing an Expert Analysis on the contents of the data packets or frames transmitted along a wireless communication channel, and displaying the results of this analysis to the user. The method of the present invention provides the benefits of efficient network monitoring using a real-time mode, thus greatly assisting the maintenance and troubleshooting of the network. The method of the present invention can also be used offline to perform an Expert Analysis on the contents of the frames after they are captured and stored in a buffer. This will enable the user to determine the performance of the network, by analyzing frames or data packets communicated across a point in the network over prior monitored periods of time. The results of the analysis then permit a user to troubleshoot and correct malfunctioning portions of the network, such as a defective wireless network interface card, disconnection of a receiving station, and so forth, for example.

The invention provides for selectively turning on or off the Expert Analysis feature. When the Expert Analysis is turned off, only statistics associated with the data packets or frames flowing across a monitored are provided;

In particular, one aspect of the present invention is directed to a method of performing an Expert Analysis of the contents of the IEEE802.11(b) header of the data packets or frames transmitted between stations in a wireless local area network, the method comprising steps of:

(a) establishing a direct wireless logical connection with the wireless communications network;

(b) receiving wirelessly, in real-time, data packets or frames transmitted in the wireless communications network;

(c) performing over a first period of time a detailed protocol analysis of the contents of the IEEE802.11(b) header of the data packets or frames, including analyzing the protocol layers in detail;

(d) displaying the results of the problem analysis to a user in real-time;

(e) storing in a memory storage device, the data packets or frames captured over a second period of time; and (f) performing over a second period of time a detailed protocol analysis on the contents of the IEEE802.11(b) header of the data packets or frames stored in the memory storage device, including analyzing the protocol layers in detail, and displaying the results to the user.

In another aspect of the present invention, a network monitoring apparatus is provided for capturing and selectively performing a detailed protocol analysis on data frames or packets transmitted between stations in a wireless communications network. The apparatus of the present invention comprises:

a wireless network interface device operable in a promiscuous mode within a wireless communications network for capturing a plurality of frames transmitted through the network;

a user interface system comprising input and output devices for enabling a user to input and obtain information associated with plurality of captured frames;

a memory storage device for storing the plurality of captured frames received from said wireless interface device; and a programmable processor unit connected to network interface device, said user interface system, and said memory storage device, said processor being programmed to execute a routine comprising the steps of:

establishing a direct wireless logical connection with the wireless communications network via the network interface device;

receiving wirelessly, in real-time, frames transmitted in the wireless communications network via direct wireless logical connection;

receiving from the user via the user interface configuration parameters, for a detailed problem analysis;

performing a detailed problem analysis on the contents of the IEEE802.11(b) headers of the captured data packets or frames, respectively, including analyzing associated protocol layers in detail; and displaying the results of the Expert Analysis to the user in real-time.

BRIEF DESCRIPTION OF THE DRAWINGS

Various embodiments of the present invention are described in detail with reference to the drawings, in which like items are identified by the same reference designation, wherein:

FIG. 2A shows a layout of the general frame format of a MAC frame for the IEEE802.11(b) standard;

FIG. 2B shows a detailed layout of the frame format of a Frame Control Field of the MAC frame shown in FIG. 2A;

FIG. 2C shows a layout of a WEP encrypted frame format.

FIG. 26A shows a layout of an Authentication Transaction Sequence Number Fixed Field associated with the Expert Analysis routine of the present invention;

FIG. 26B shows a layout of a Reason Code Fixed Field associated with the Expert Analysis routine of the present invention;

FIG. 26C shows a layout of a Status Code Fixed Field associated with the Expert Analysis routine of the present invention;

FIG. 27A shows a layout of a Capability Information Fixed Field associated with the Expert Analysis routine of the present invention;

FIG. 27B shows a layout of an SSID Information Element Format associated with the Expert Analysis routine of the present invention;

FIG. 27C shows a layout of a DS Parameter Set Information Element Format associated with the Expert Analysis routine of the present invention.

DETAILED DESCRIPTION OF THE INVENTION

Figure 1:
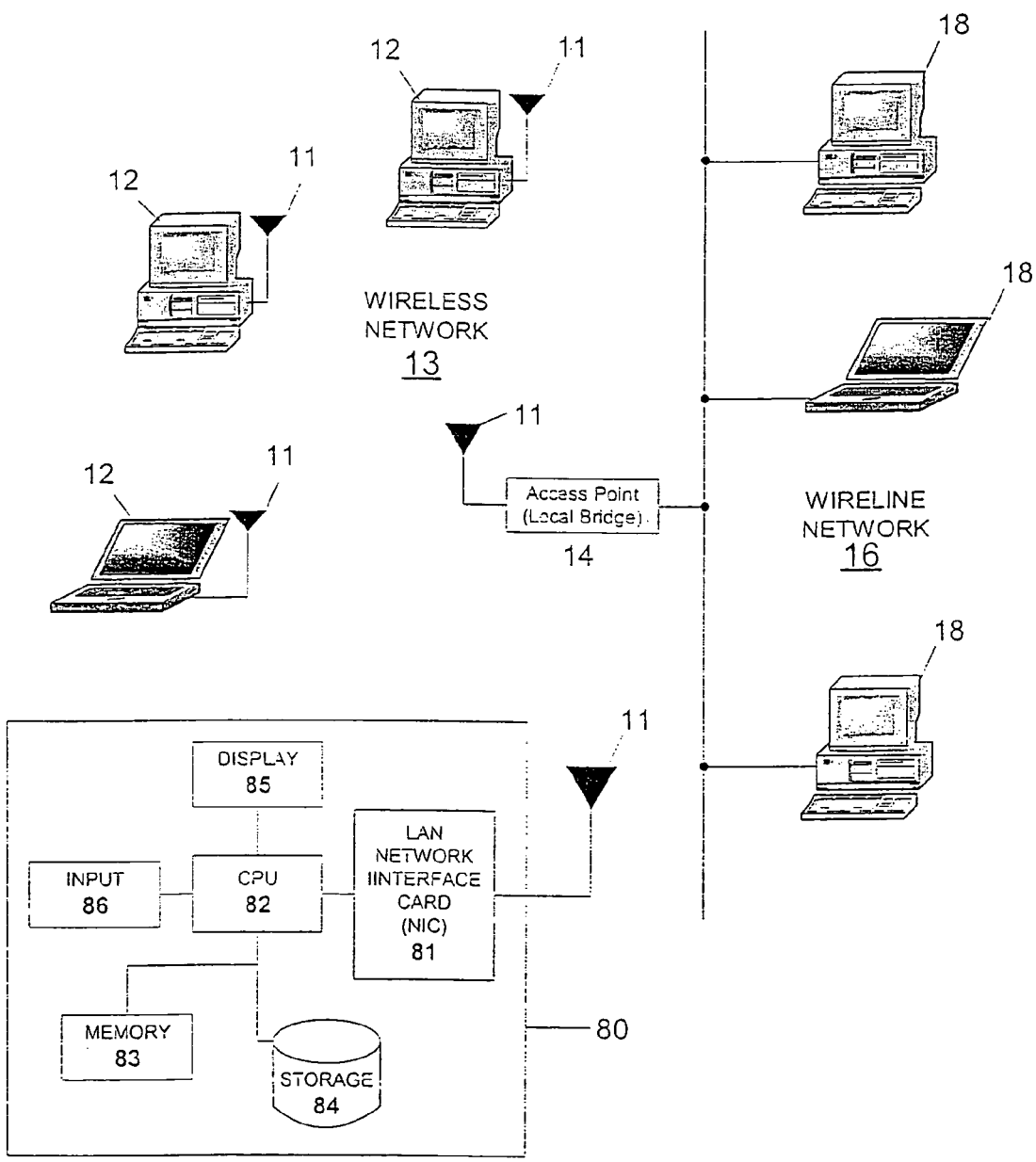
FIG. 1 shows a block schematic diagram of a computer network comprising a wireline network in communication with an IEEE802.11(b) wireless media Local Area Network (LAN)

The present invention is generally directed to a method and apparatus for capturing data packets and frames transmitted through a corresponding wireless communication channel, and for selectively performing an Expert Analysis on the contents of the data packets and frames of one or more protocol layers, and displaying the results of the analysis to a user in real-time. For the purposes of this invention, the term Expert Analysis relates to the detailed protocol analysis of the contents of IEEE802.11(b) headers of data packets or frames, including analyzing associated protocol layers in detail, for all stations or devices in a network. The present invention significantly improves network maintenance and troubleshooting by producing diagnostic, warning and alarm messages related to problems observed in the network. A recently introduced "Sniffer® Wireless" product of Networks Associates Technology, Inc., of Santa Clara, Calif. (Assignee of the present invention), incorporates various embodiments of the present invention.

One embodiment of the invention includes an Expert Analyzer, which is a sophisticated network analysis tool that uses proprietary heuristics embedded in real-time protocol interpreters to construct a virtual model of the network being analyzed. During Expert Analysis, Sniffer® Wireless constructs a database of network objects from the wireless traffic it sees. The Expert's real-time protocol interpreters learn all about the network stations, routing nodes, subnetworks, and connections related to the frames in the capture buffer. Using this information, Sniffer® Wireless detects and alerts users to potential problems that may exist on the wireless network. These problems are categorized as being either symptoms or diagnoses:

A symptom indicates that a threshold has been exceeded and may indicate a problem on the network being analyzed.

A diagnoses can be several symptoms analyzed together, high rates of recurrence of specific symptoms, or single instances of particular network events that cause the Expert to conclude that the network has a real problem. A Diagnosis should be investigated immediately by a user.

The Expert Analysis results (symptoms and diagnoses) are shown in five viewing panes on an Expert display tab and on a real-time Expert window that displays during capture. These panes function together so that a user can view and select information at all levels of detail. Please refer to FIG. 30.

Each pane is described below:

An Expert Overview pane 3002 shows the network analysis layers (similar in concept to the ISO layers) and the Expert overview statistics (objects, symptoms, or diagnoses) for each layer. By selecting a combination of layer and statistic type, one can control the display of Expert analysis data in the other Expert panes.

An Expert Summary pane 3008 shows key summary information for the layer and statistic selected in the Expert Overview pane. The column headings for the Expert Summary display will change, depending on what layer and statistic has been user selected.

A Protocol Statistics pane 3004 displays the amount of traffic (in frames and bytes) for each protocol encountered for the layer selected in the Expert Overview pane. (This pane is not displayed when the Expert Overview pane is narrow.)

A Detail Tree pane 3006 shows a hierarchical listing of all layers at or below those selected in the Expert Overview and Expert Summary panes. A user is provided a menu to permit the user to expand or collapse each layer. A user is provided Click on any item in the Detail Tree to display its Expert detail data.

An Expert Detail panes 3010, 3012, 3014, and 3016, are a collection of information tables for the data selected by the other panes. The content of the Expert Detail pane will vary, depending on what items are selected in the various other panes.

The present invention is used in network analysis tools for wireless Local Area Network (LAN) systems conforming to the IEEE802.11(b) standard, but is not meant to be so limited. A wireless LAN system includes a plurality of devices or stations, such as workstations, printers, storage devices, servers, and the like connected to one another by wireless communications channels. The wireless LAN is configured so as to enable a message, usually a data packet or frame to be directed from a source to a destination. In this regard, each station of interest is provided with a network address that is unique to that particular station in the computer network. Typically, each station will have a single network address that is used by the system in order to locate that particular station. In this manner, any information or data that is to be transmitted or relayed to a specific station is accomplished by the use of the network addressing system. Although an IEEE802.11(b)-based wireless LAN system is described in connection with the present invention, one of ordinary skill in the art will understand that the present invention may be applied in other types of wireless communication networks.

With reference to FIG. 1, one configuration of a wireline and wireless LAN-based communication network 10 is shown. The network 10 comprises a plurality of wireless stations 12, and a wireless local bridge or access point 14 connected to a wireline network 16 of a plurality of wired stations 18. Although only one access point 14 is shown, in certain applications a plurality of access points 14 may be used. Each of the wireless stations 12 include a wireless network interface device 11 for interfacing with other wireless stations 12, and with the access point or points 14 to form a wireless network 13. Such a wireless network interface device, for example, is a Cisco Aironet Series 340 or Series 350 Wireless LAN Adapter, Cisco Systems, San Jose, Calif., or is a Symbol Technologies Spectrum 24 High Rate Adapter LA-4121-1020US. The wireless network interface device 11 transmits the digital signal from the wireless stations 12 to the wireless medium to enable efficient transfer between a sending station and a receiving station, typically in the form of RF signals. The access point(s) 14 enables communication between the wireless network stations 12 and the wired network stations 18, thereby expanding the associated LAN's capability. Information, control signals and other forms of digital data can be transmitted between stations 12 and 18 in the form of discrete data frames via network 10. The data frames, as one skilled in the art will recognize, are provided in a specific format commonly used in the transmission of data through the network 10.

A wireless network monitoring tool 80 of the present invention includes a wireless network interface device 11 connected to a wireless LAN network interface card (NIC) 81, for creating a connection with the LAN 10 so as to determine the topology of the LAN 10, and to monitor other network functions and data frame transmissions. The monitoring tool 80 further includes a processing unit or CPU 82 to receive information regarding the operation of the network 10. A memory 83 and a storage device 84 are connected to the processor 82 to provide temporary and permanent storage, respectively, of information required by the processor 82. A display unit 85 is connected to the processor 82 so as to display, generally in graphic form, information about the network 10 including its topology, data traffic stream, and functions and services. Through input devices 86 such as a keyboard, a mouse and the like, connected to the processor 82, and through a graphical user interface, a user can perform various analysis of the network 10 and monitor data transmissions. The display unit 85, the input devices 86, and the graphical user interface are collectively referred to as a user interface system. The monitoring tool 80 can be considered just another station in the wireless network 13, similar to the workstations, printers, storage devices, servers, and so forth, but it runs in a promiscuous mode, which will enable it to receive and analyze the packets sent to other stations as well.

The graphical user interface is preferably executed on a processor capable of supporting at least one of Windows NT 4.0, Windows 98SE, or Windows 2000 Professional. Any one of a number of commercial or proprietary processors may be used. Generally, the processor 82 requires a minimum of 128 MB (Megabytes) of RAM, 256 MB (Megabytes) of Swap Space, and 4 MB (Megabytes) of available disk drive space. The present invention may be built using available components or modules.

For the purposes of this invention, a frame represents a discrete logical unit of data transmitted through a communications network or channel from a sender station to a receiving station. The data is commonly a fragment of a much larger set of data, such as a file of text or image information. As the larger file is prepared for transmission, it is fragmented into smaller data units. Each fragment of data is packaged into a frame format, which comprises a header, payload, and trailer. The header prepends the payload and includes a set of framing bits, which are used for purposes of frame delineation and synchronization of the receiving station with the speed of transmission across the transmission link. Also included in the header are routing control information, and address information. Following the header is the payload, which contains the data unit being transmitted. Appending the payload is the trailer, which comprises data bits used for error detection and correction, and a final set of framing bits, or ending flag for purposes of frame delineation. The frame format of a frame is specific to the data communications protocol (i.e., IPX, IP, LLC, SNAP, etc.) being utilized in the network. The present invention is described in correspondence with the frame format used in IEEE802.11(b) LANs, although it will be understood that the present invention may also be modified for use in connection with other types of frame formats and data communications protocols. Note that a frame can only be associated with a unicast address for a source address. A frame address cannot be associated with a multicast address, since the latter is out of a group of stations, making it impossible to know the source of a frame generated by a member of the group.

The IEEE802.11(b) wireless LAN system includes a MAC (Medium Access Control) layer embodying a set of protocols which are responsible for maintaining order in the use of a shared medium. There are three types of frames that are transmitted at the MAC layer. The following list summarizes the frame types and subtypes and their main function or service in connection with the 802.11(b) MAC layer protocols:

1) IEEE802.11 (b) Management Frames: The purpose of 802.11(b) management frames is to establish and maintain communications between stations and access points. Thus, management frames provide such services as association and authentication, and are defined as follows:

a) Association Request frame: A station will send this frame to an access point if it wants to associate with that access point. If the access point grants permission for association, the station will be associated with the access point.
   b) Association Response frame: After receiving an Association Request frame, an access point sends an Association Response frame to indicate the result of an association request.
   c) Reassociation Request frame: A station will send this frame to an access point if it wants to reassociate with that access point.
   d) Reassociation Response frame: The access point sends the Reassociation Response frame to indicate the result of a reassociation request.
   e) Probe Request frame: A station sends a probe response frame to obtain information from another station or access point.
   f) Probe Response frame: If a station or access point receives a Probe Request frame, it will respond to the sending station with a Probe Request frame containing specific parameters about itself.
   g) Beacon frame: In an infrastructure network, an access point periodically sends a Beacon frame that contains a timestamp and configuration information about the access point.
   h) ATIM frame: A station which has frames buffered for other stations sends an ATIM (Announcement Traffic Indication Message) frame to each of these stations during an ATIM window immediately following, the transmission of a Beacon frame.
   i) Disassociation frame: If a station or an access point wants to disassociate, it will send this frame.
   j) Authentication frame: A station sends an Authentication frame to a station or an access point for which it requests secure communication.
   k) Deauthentication frame: A station sends a Deauthentication frame to a station or access point for which it requests to end a secure communication.

2) IEEE802.11(b) Control Frames: After establishing association and authentication between stations and access points, control frames provide the functionality to assist in the delivery of data frames. Control frames are defined as follows:

a) Request to Send (RTS): A station sends an RTS frame to a receiving station to negotiate the sending of a data frame that will follow.
   b) Clear to Send (CTS): The station that is the receiver of the RTS frame sends a CTS frame to acknowledge the right for the sending station to send the data frames.
   c) Acknowledgment (ACK): When a station receives an error-free frame, the station can send an ACK frame to the sending station to acknowledge that it successfully received the frame.
   d) Power-Save Poll (PS Poll): If a station receives a PS Poll frame, it updates its network allocation vector (NAV), which is an indication of time periods that a station will not initiate a transmission.
   e) Contention-Free End (CF End): The CF End frame designates the end of a contention free period.
   f) CF End+CF-ACK: This frame acknowledges the Contention-Free End announcement of a CF End frame.

3) IEEE802.11(b) Data Frames: The main purpose of data frames is to carry information to the destination station for handoff to its applicable LLC (Logical Link Control) layer.

With reference to FIG. 2A, the frame format of a MAC frame 20 is shown. The frame 20 comprises generally a MAC header 22, a payload or frame body 24, and a trailer or frame check sequence 26. The MAC header 22 may further include at least one of the following information fields: a frame control field 28 for carrying control information being sent from station to station, a duration AID field 30 for carrying information about the time duration the channel will be reserved or the association id, Address 1-4 fields 32, 34, 36, and 38, respectively, which convey the Basic Service Set Identification (BSSID), source address, destination address, sending station address, and receiving station address, respectively, and a sequence control field 40 which indicates the sequence and fragment numbers of the frame 20. The frame body 24 includes a variable length payload, and carries information that pertains to the specific frame being sent. The data frame may contain a data unit. The control frames don't have a frame body 24. The MAC management frames may include specific parameters in the frame body 24 that pertain to a particular service or network functions the frame is implementing. The frame check sequence 26 contains information that is used to validate successful reception of frame 20. The frame format of the MAC frame 20, shown in FIGS. 2A and 2B, is true for all frames transmitted by a sending station to a receiving station, regardless of frame type. However, some of the fields may be omitted from control and management frames as explained in the IEEE802.11(b) standard.

As shown in FIG. 2B, the frame control field 28 which carries the critical control information may be further broken down into a protocol version subfield 42, a frame-type subfield 44, a frame-subtype subfield 46, a "To DS" and "From DS" subfields 48 and 50, respectively, a "more frag" subfield 52, a retry subfield 54, a power management subfield 56, a "more data" subfield 58, a "WEP (wired equivalent privacy)" subfield 60, and an "order" subfield 62. The protocol version subfield 42 indicates the version number of the data communication protocol creating the frame 20. The type subfield 44 contains information that defines whether the frame 20 is a management, control, or data frame as indicated by the bits in Table 1 below. The subtype subfield 46 contains information that defines the service or function of the frame 20 also shown in Table 1A and 1B below.

TABLE 1A

Valid Type and Subtype Combinations

| Type | Type Description | Subtype Value | Subtype Description |
|---|---|---|---|
| 00 | Management | 0000 | Association request |
| 00 | Management | 0001 | Association response |
| 00 | Management | 0010 | Reassociation request |
| 00 | Management | 0011 | Reassociation response |
| 00 | Management | 0100 | Probe request |
| 00 | Management | 0101 | Probe response |
| 00 | Management | 0110-0111 | Reserved |
| 00 | Management | 1000 | Beacon |

TABLE 1A-continued

Valid Type and Subtype Combinations

| Type | Type Description | Subtype Value | Subtype Description |
|---|---|---|---|
| 00 | Management | 1001 | Announcement traffic |
| 00 | Management | 1010 | Disassociation |
| 00 | Management | 1011 | Authentication |
| 00 | Management | 1100 | Deauthentication |
| 00 | Management | 1101-1111 | Reserved |
| 01 | Control | 0000?1001 | Reserved |
| 01 | Control | 1010 | Power Save (PS)-Poll |
| 01 | Control | 1011 | Request To Send (RTS) |
| 01 | Control | 1100 | Clear To Send (CTS) |

TABLE 1B

Valid Type and Subtype Combinations

| Type | Type Description | Subtype Value | Subtype Description |
|---|---|---|---|
| 01 | Control | 1101 | Acknowledgment (ACK) |
| 01 | Control | 1110 | Contention-Free (CF)-End |
| 01 | Control | 1111 | CF-End + CF-Ack |
| 10 | Data | 0000 | Data |
| 10 | Data | 0001 | Data + CF-Ack |
| 10 | Data | 0010 | Data + CF-Poll |
| 10 | Data | 0011 | Data + CF-Ack + CF-Poll |
| 10 | Data | 0100 | Null function (no data) |
| 10 | Data | 0101 | CF-Ack (no data) |
| 10 | Data | 0110 | CF-Poll (no data) |
| 10 | Data | 0111 | Cf-Ack + CF-Poll (no data) |
| 10 | Data | 1000-1111 | Reserved |
| 11 | Reserved | 0000-1111 | Reserved |

The "To DS" subfield 48 and the "From DS" subfield 50 defines whether the frame is being sent to a distribution system or leaving a distribution system, respectively. The term "distribution system" refers to a system used to interconnect a set of basic service sets (BSS) and integrated LANs to create an extended service set (ESS). The "To DS" subfield 48 and the "From DS" subfield 50 are set to zero for all management and control frames, because these frame are valid only within a basic service set (BSS). Depending on the bit sequence set in the "To DS" and "From DS" subfields 48 and 50 of a data frame, the contents of the Address 1-4 fields 32, 34, 36, and 38 will have a specific meaning. Table 2 lists the possible values of the address field depending on the bit sequence set for the "To DS (Distribution System)" and "From DS" subfields, as shown below.

TABLE 2

Address filed contents for data frames

| To DS | From DS | Address1 1 | Address 2 | Address 3 | Address 4 |
|---|---|---|---|---|---|
| 0 | 0 | DA | SA | BSSID | N/A |
| 0 | 1 | DA | BSSID | SA | N/A |
| 1 | 0 | BSSID | SA | DA | N/A |
| 1 | 1 | RA | TA | DA | SA |

A station uses the contents of the "Address 1" field 32 to perform the address matching of target receiving stations. In cases where the "Address 1" field 32 contains a broadcast address (0xFFFFFFFFFFFF) or group address (multicast address), the "BSSID"(Basic Service Set Identification) is also validated to ensure that the broadcast or multicast originated in the same BSS (Basic Service Set).

The receiving station uses the contents of the "Address 2" field 34 of the current frame to direct the acknowledgement (if acknowledgment is necessary). The DA (destination address) is the destination of the data residing in the "Frame Body" field 24 of frame 20. The SA (source address) is the address of the MAC entity that initiated the data that is carried in the "Frame Body" field 24. The RA (receiver address) is the address of the station contained in the Access Point 14 in the wireless distribution system 13 that is the next intended recipient of the frame. The TA (transmitter address) is the address of the station contained in the Access Point 14 in the wireless distribution system13 that is transmitting the frame. The "BSSID (Basic Service Set Identification)" field contains either the MAC address of the Access Point or the BSSID of the IBSS (Independent Basic Service Set). If the content of the "Address 4" field 38 is shown as "N/A" (not applicable) then this address field is omitted from the frame.

The "More Frag" subfield 52 indicates whether another fragment of the same frame 20 will follow in a subsequent frame. IEEE802.11(b) protocol allows management and data frame types to be fragmented at the MAC layer in order to increase the possibility of delivery of the original large frame. The receiving station supports a mechanism that will allow it to reassemble the fragmented frames originated from a sending station. The "retry" subfield 54 indicates whether the frame 20 is a retransmission of an earlier frame, where the reason for retransmission may be due to errors in the transmission of the first frame that resulted in an unsuccessful frame check sequence processing.

The "Power Management" subfield 56 indicates the power management mode that the sending station will reside in after the current frame exchange sequence. The "More Data" subfield 58 alerts the receiving station in power-save mode to prepare to receive additional frames. The "Wired Equivalent Privacy" (WEP) subfield 60 indicates to the receiving station that a wired equivalent privacy algorithm has processed the data contained in the Frame Body 24, that is, the data bits have been encrypted using a secret key for increased security and privacy. The Order subfield 62 indicates whether the frame 20 was sent using a "Strictly Ordered" service class (not shown), which tells the receiving station that frames must be processed in a particular order and indicating the order sequence. The bit data contained in the corresponding fields and subfields of the frame 20, provide information as to the frame type and subtype as well as its service or function of the corresponding frame.

The Network Monitoring tool 80 (as shown in FIG. 1) operates to wirelessly "tap" into the wireless network 13 and capture the data frames transmitted in the network 13. In one embodiment of the present invention, the user, upon capturing the transmitted frames, may choose to perform an Expert Analysis on the contents of the captured frames. Even though the general structure of the IEEE802.11 frames fit the frame format of a MAC frame 20 shown in FIG. 2A, actual frame format depends on the frame type of the frame. Therefore the Expert Analysis of the frames is performed frame by frame to determine the reason(s) that defect(s) and/or errors are occurring. As previously indicated, if the Expert Analysis is turned off only the statistics for a node being monitored can be obtained relative the packets or frames traveling across the node.

Figure 28:
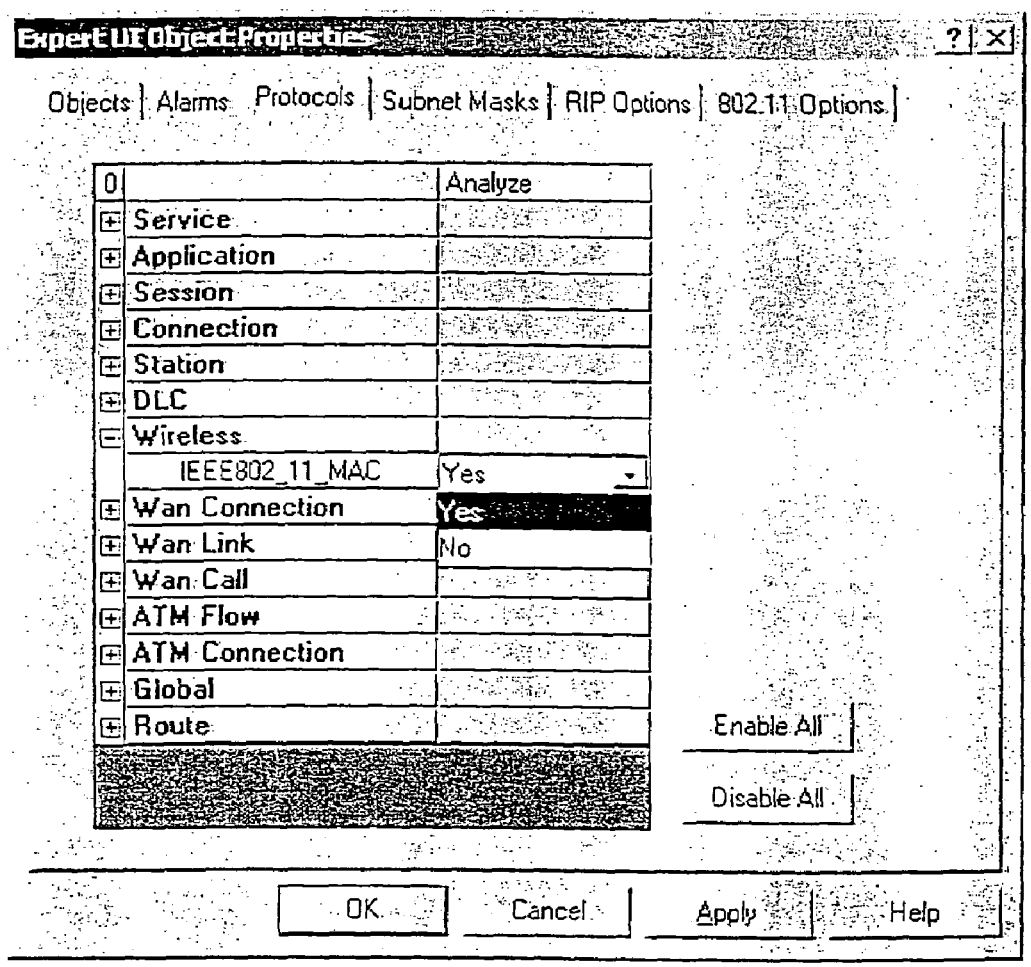
FIGS. 28 through 32 show different screen display examples for use in one embodiment of the invention.
Figure 29:
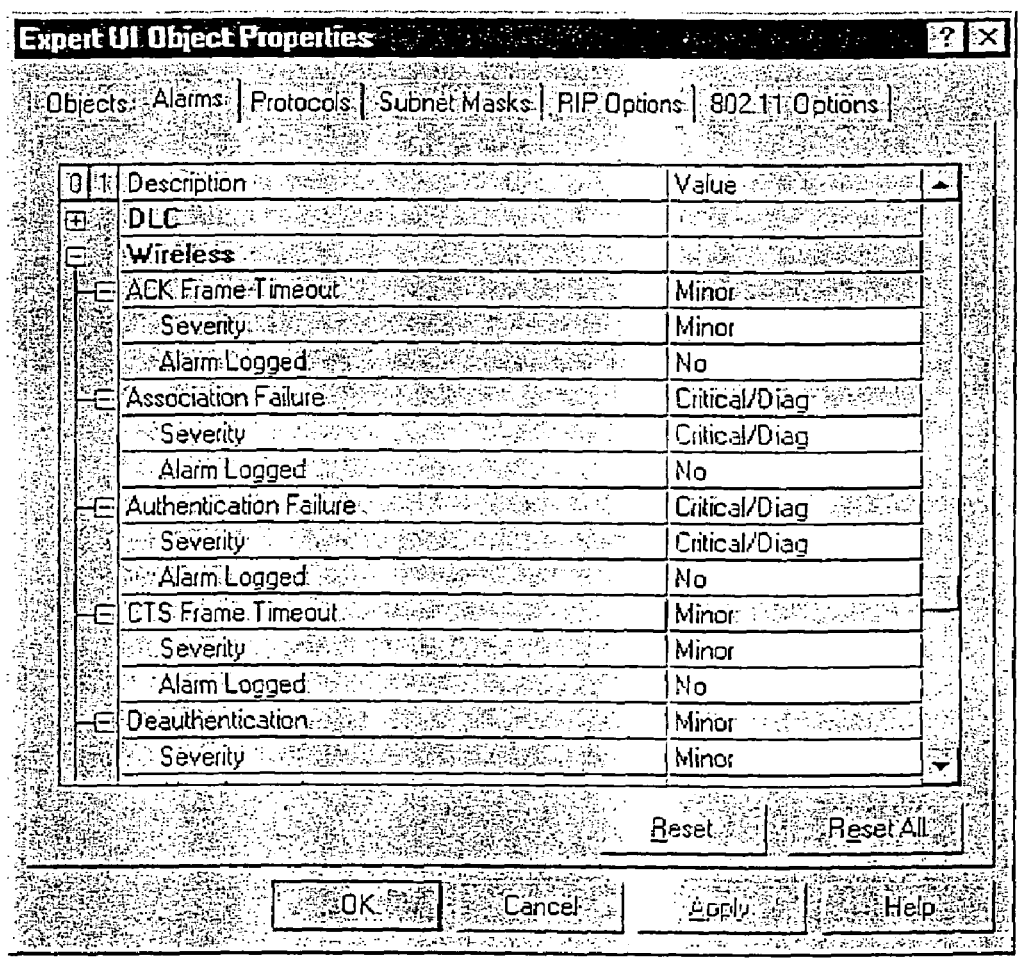
Figure 32:
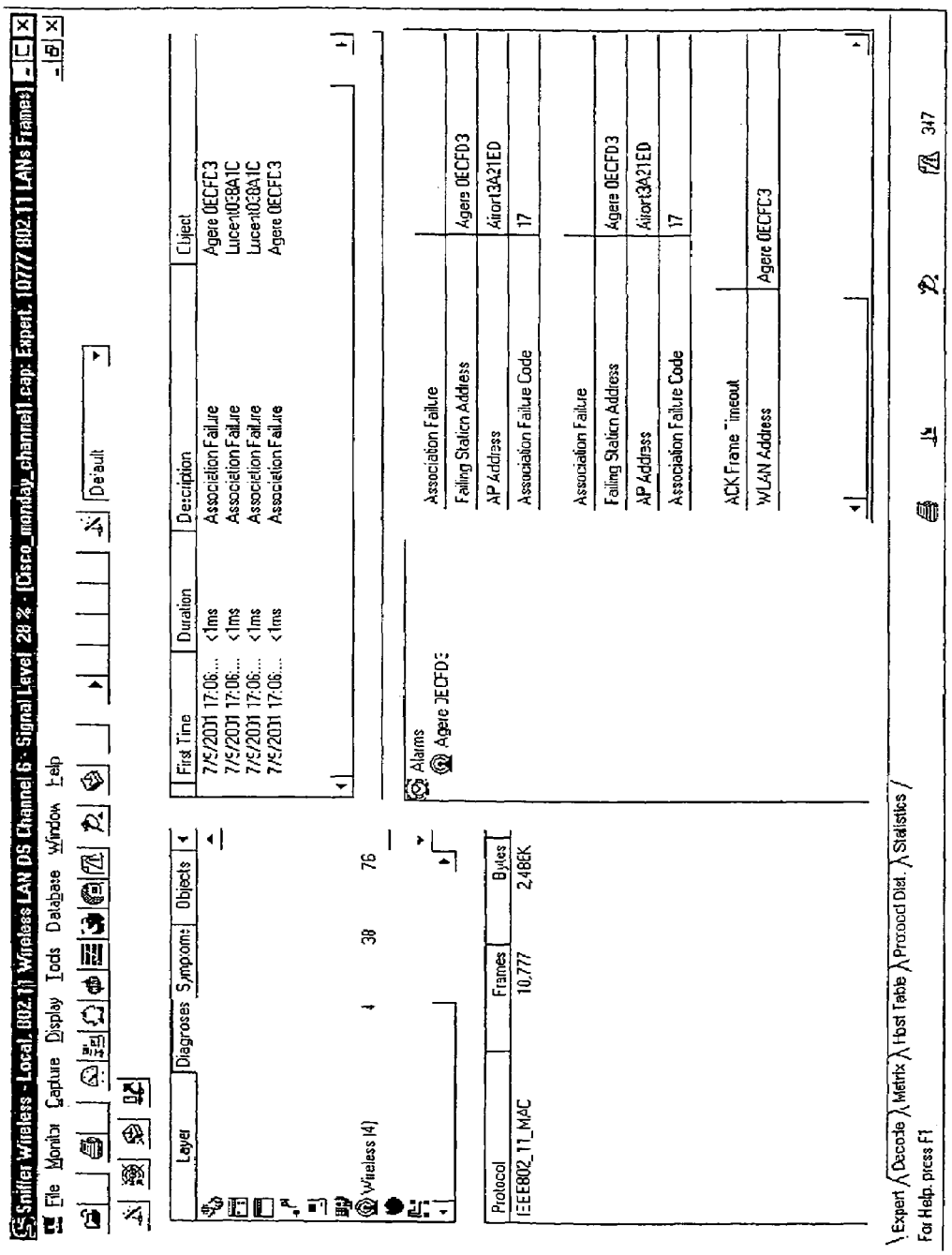

The user has the flexibility to selectively turn on or off the Expert Analysis of any of the protocol layers. When the Expert Analysis for such a layer is turned off, the higher protocol layers are not used in the analysis. Lower protocol layers are not affected. A typical display of the user interface for controlling analysis parameters of different protocols can be seen in FIG. 28. One of the most important functions of the Expert Analysis is its ability to warn the user of certain network and protocol errors in the network by generating alarms related to these errors. The user has full control over controlling certain parameters related to each protocol including activating or deactivating alarm generation. Each alarm created by the Expert Analysis can selectively have any one of the five different severity levels. The framework assigns a default severity level for a particular alarm. However the user can change that severity level. The user can also choose if an alarm type will be logged when it is generated. Depending on the severity level an alarm is marked as either a diagnosis or a symptom. The Diagnosis category includes alarms that have higher severity levels. The display of a user interface for controlling alarm parameters is shown in FIG. 29. A typical display of the diagnosis objects is shown in FIG. 32.

Figure 30:
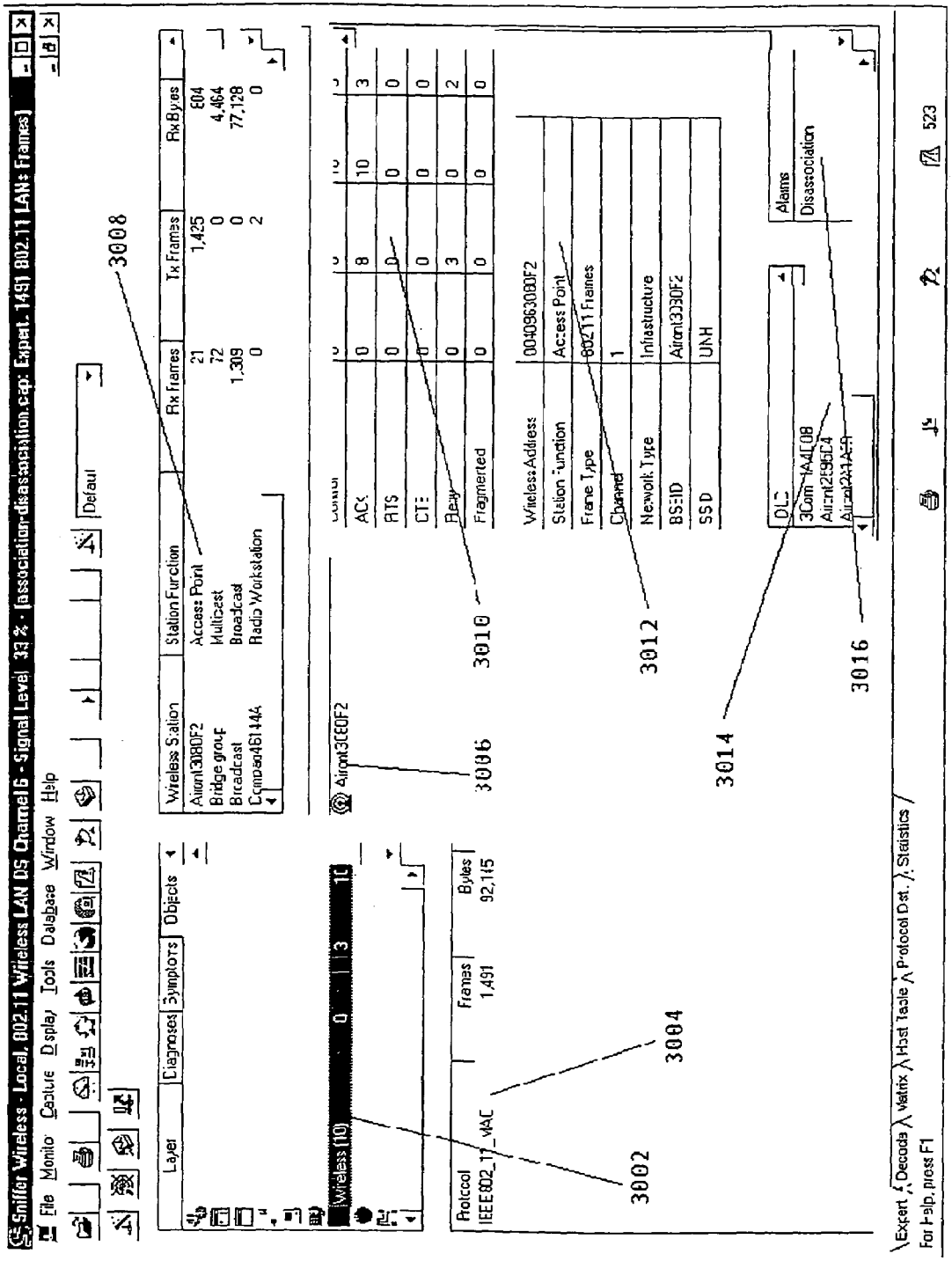

The results of the Expert Analysis are shown to the user through its user interface. The display of a typical expert result screen is shown in FIG. 30. The field 3002 shows the layers of protocols that are analyzed for this capture. The wireless layer is selected in FIG. 30. The total number of frames and octets analyzed for this protocol layer is displayed in field 3004. Field 3006 is used to show the lower layer objects linked to the current selected object in field 3008. Since there is not any lower protocol layer analyzed by the Sniffer® Wireless (Network Associates, Inc., Santa Clara, Calif.) monitoring tool 80, there is no lower layer links show in FIG. 30. The hosts created for the wireless layer are shown in field 3008. The columns of field 3008 identify the attributes of the hosts created. This is a summary view that shows all hosts created for wireless together. The detailed statistics gathered by the selected host is shown in field 3010. The host attributes such as MAC address, station function, frame types, channel, network type, BSSID, and SSID are shown in field 3012. The higher layer DLC objects that are linked to the selected wireless layer host are shown in field 3014. The alarms associated with the selected host are shown in field 3016.

Figure 31:
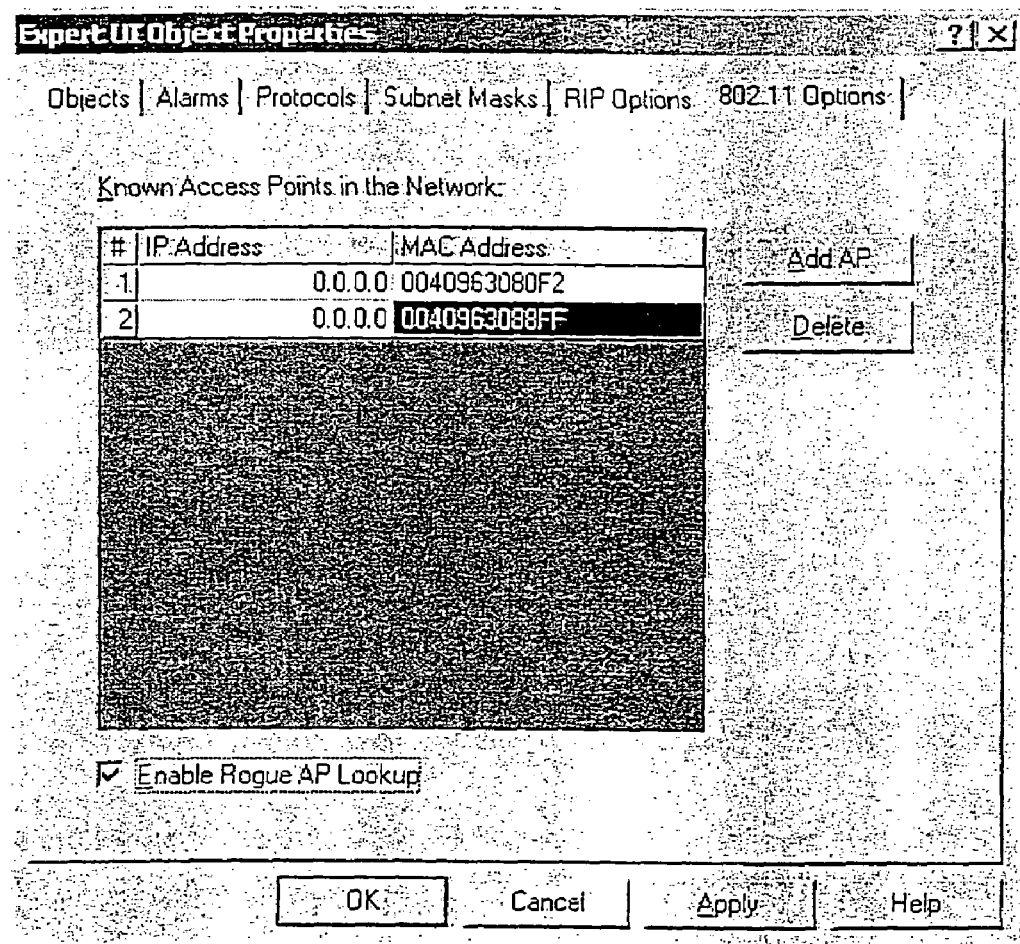

Sometimes, the user might want to know if there are access points 14 operating in the wireless network 13 that he or she does not know about. A Sniffer® Wireless product monitoring tool 80 has a user interface where the user can enter the MAC addresses of the known access points 14. Then the user can choose to turn rogue access point detection on. As new access points 14 are discovered they are checked against a known list of the access points 14. If the newly discovered access point 14 is not in the list it is marked as a rogue access point. The display of a user interface for entering the known access points 14 is shown in FIG. 31.

Figure 3:
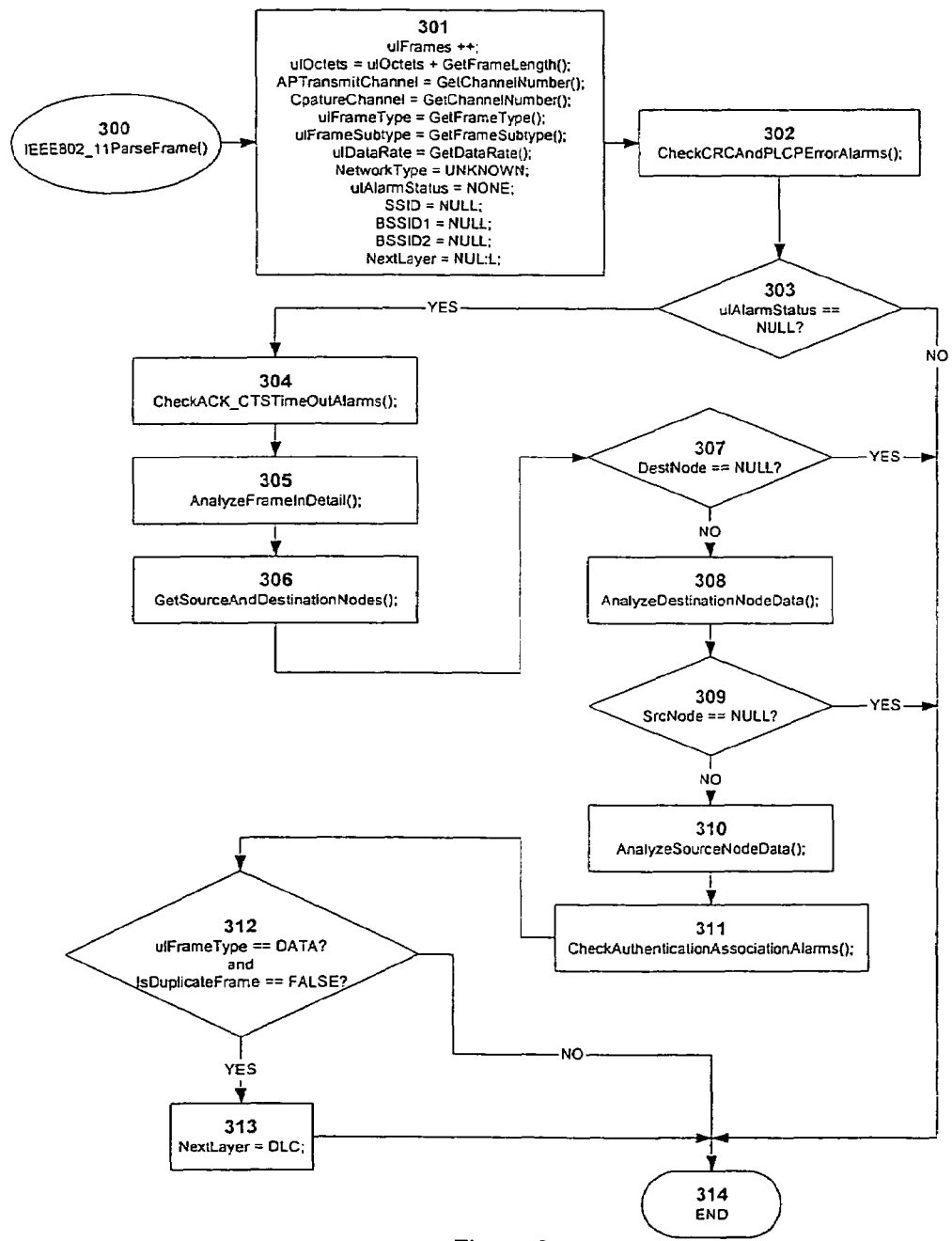
FIG. 3 shows a flowchart of an Expert Analysis routine for one embodiment of the present invention.

With reference to the flowcharts of FIGS. 3 through 25, the operation of the present invention will now be described in greater detail. With reference to FIG. 3, the routine of the present invention is initiated in step 300 of the IEEE802_11ParseFrame( ) routine. In step 300 the frame initiates the Expert Analysis process for the wireless frames as the frames are captured in real time. As the network-monitoring tool 80 receives frames from the wireless medium it stores them into the memory 83. As the frames are stored, the Expert Analysis is performed in each frame by calling the IEEE802_11 ParseFrame( ) routine at step 300. The display of the statistics, alarms and diagnostic information determined by the Expert Analysis is displayed to the user through an Expert User interface. The framework periodically displays the results of the real-time Expert Analysis depending on the processing resources available.

With respect to the flowchart of FIG. 3, the IEEE802_11ParseFrame( ) programming routine is defined in steps 300 through 314. The IEEE802_11ParseFrame( ) routine performs the Expert Analysis on the contents of the IEEE802.11(b) header of the frames captured wirelessly form the network 10. After initiation at step 300, the routine proceeds to step 301 where it initializes certain variables that will be necessary for further analysis of the current frame. The wireless expert keeps track of each frame and its size through the variables ulFrames and ulOctets. For each wireless frame the ulFrames is incremented by one, and the ulOctets variable is incremented by the size of the current frame. The GetFrameLength( ) function returns the length of the frame in terms of octets. The details of this function are beyond the scope of this invention. The variables APTranmitChannel and CaptureChannel are initialized to the current channel in which frames are captured. This is accomplished by calling the GetChannelNumber( ) routine, the details of which is beyond the scope of this invention. GetFrameType( ) and GetFrameSubtype( ) functions at step 401 to determine the frame type and subtype of the current frame. The GetFrameType( ) and GetFrameSubtype( ) functions return the frame type and subtype by checking the "Type" and "Subtype" fields 44 and 46, respectively, of FIG. 2B, respectively. The routine determines the frame type and subtype according to the corresponding bit values listed in Table 1. The results of the GetFrameType( ) and GetFrameSubtype( ) functions are stored in the "ulFrameType" and "ulFramSubtype" variables. The IEEE802.11(b) standard allows four different data rates for frame transmission. The data rate the current frame is transmitted is stored in the ulDataRate variable. This variable is initialized by calling a GetDataRate( ) routine. The four possible values returned by this function are 1 Mbit/second, 2 Mbit/second, 5.5 Mbit/second and 11 Mbit/second. The NetworkType variable is initialized to "Unknown". The IEEE802.11b standard classifies two different network types for wireless LANs. One is called "Infrastructure" networks and the other is called "Independent Basic ServiceSet" (IBSS). The Infrastructure Network consists of a wireless LAN 13 connected to a wireline LAN 16 through an access point 14. Therefore the access point 14 acts as a bridge between the two networks 13,16 as shown in FIG. 1. However, the IBSS network consists of several wireless stations communicating with each other using the wireless medium. One of the tasks of the present Expert Analysis is to determine the type of the network a wireless station belongs to by analyzing the contents of the frames. At step 301, the routine then initializes the ulAlarmStatus variable to OK. This variable will be used to determine if the frame will have some physical errors such as Cyclical Redundancy Check (CRC) error, and Physical Layer Convergence Protocol (PLCP) error. Each wireless network is identified by a Service Set Identifier (SSID). This is an octet string with a maximum size of 32 octets. The SSID variable is initialized to null. The other two variables BSSID1 and BSSID2 are also initialized to null. The NextLayer variable is also initialized to null, which indicates that the next expert layer is not yet known.

Figure 4:
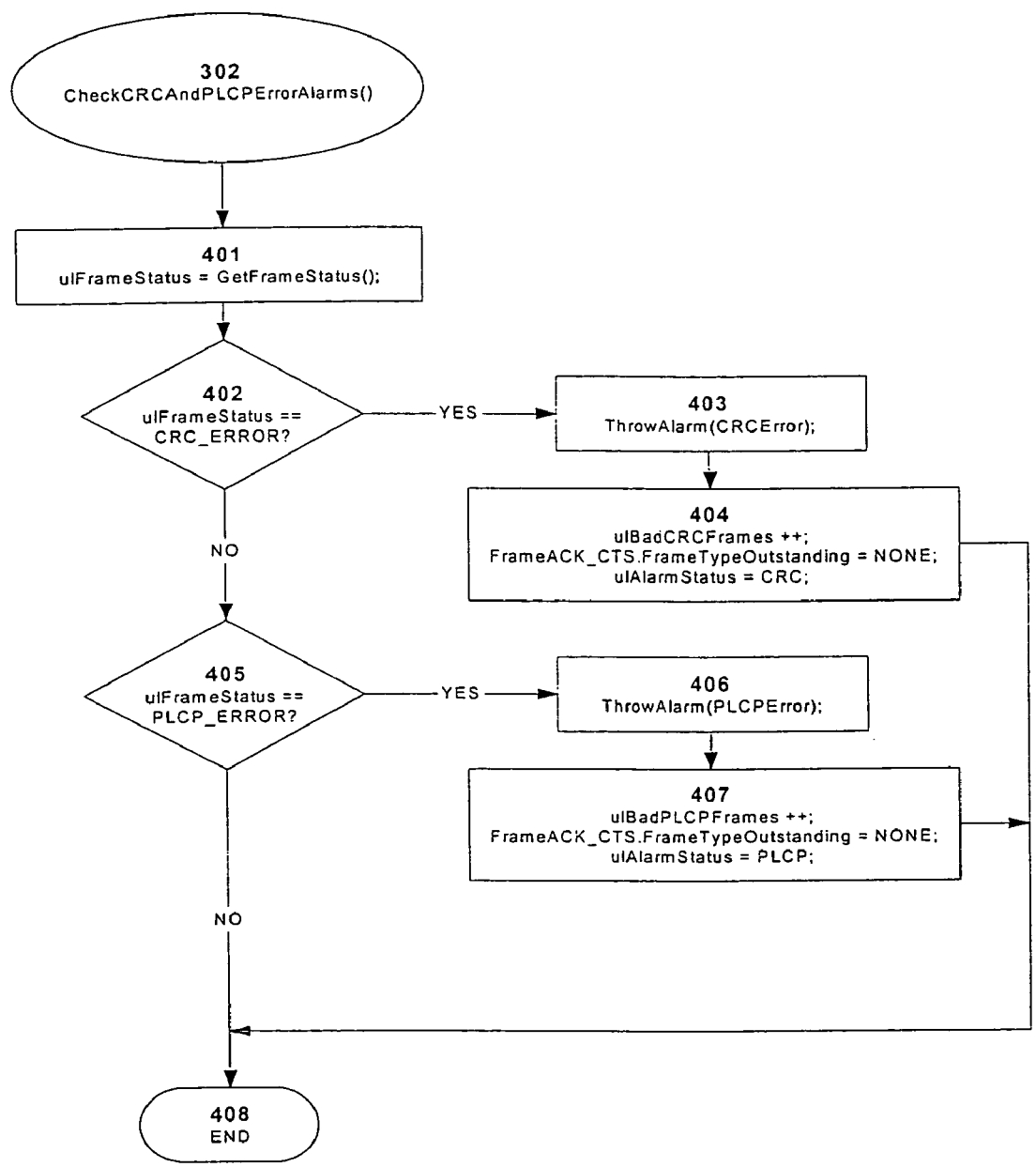
FIG. 4 shows a flowchart of a subroutine for checking the Cyclical Redundancy Check (CRC) and the Physical Convergence Layer Protocol (PLCP) error step 302 of the Expert Analysis routine of FIG. 3.

After the initialization step 301, the routine proceeds to step 302 to execute the CheckCRCAndPLCPErrorAlarms( ) routine to determine if the frame has CRC and PLCP errors as described in greater detail by the flowchart of FIG. 4. The routine then proceeds to step 303 to determine if the alarm status is still empty. If "No", then the routine terminates at step 314 and further Expert Analysis stops due to CRC or PLCP errors. If the result of step 303 is "Yes", then the routine proceeds to step 304 to execute the CheckACK_CTSTimeOutAlarms( ) routine to determine if there are any ACK and CTS frame timeout alarms as described in greater detail by the flowchart of FIG. 5.

Figure 6:
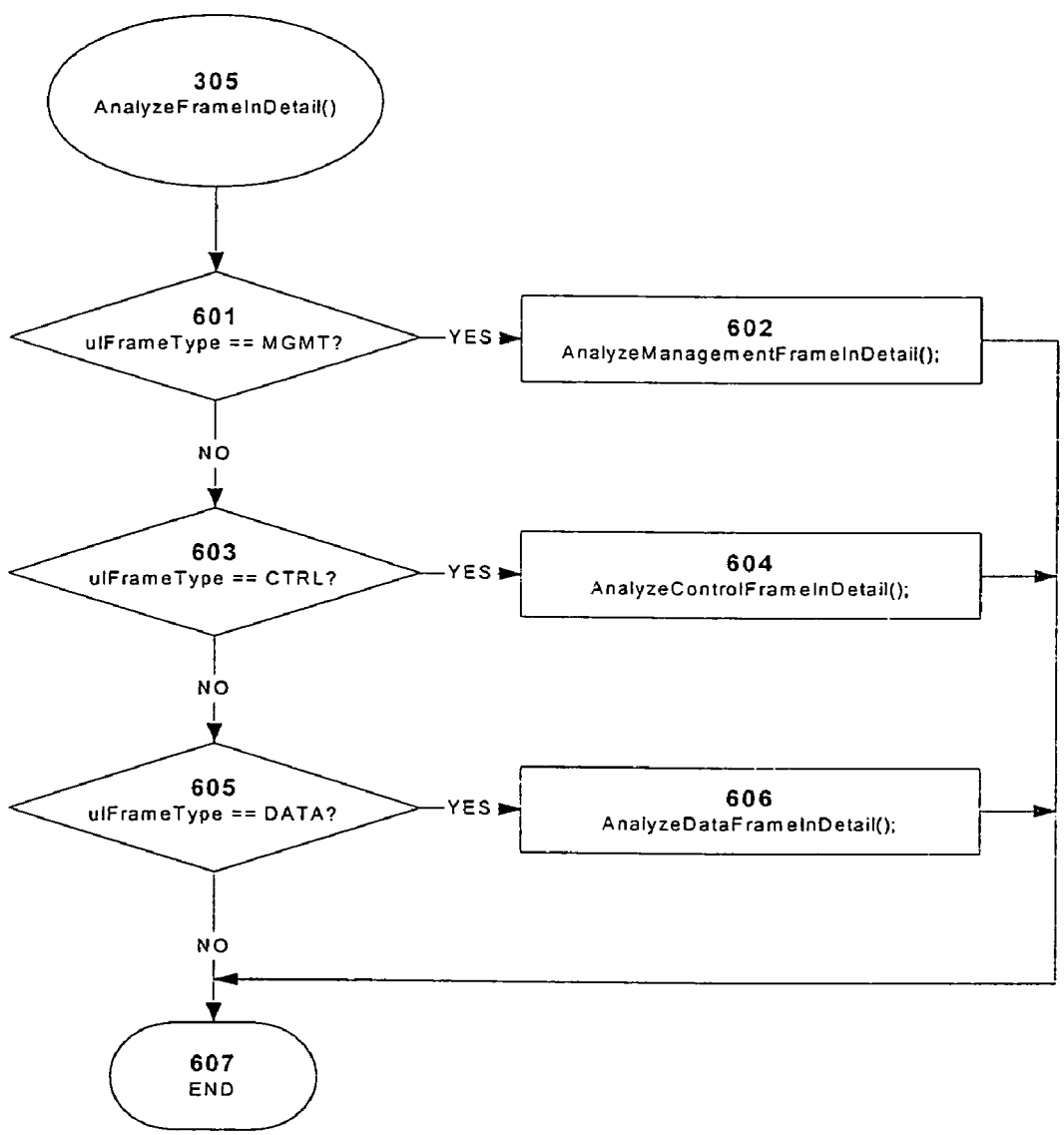
FIG. 6 is a flowchart of a subroutine for analyzing in detail the frames associated with step 305 of the Expert Analysis routine of FIG. 3.

The routine then proceeds to step 305 to execute the AnalyzeFrameInDetail( ) routine to obtain more information about the frames relating to the statistics, network and station types as described in greater detail by the flowchart of FIG. 6. The routine then proceeds to step 306 where it executes the GetSourceAndDestinationNodes( ) routine to get the source and destination node objects that keep the state of the wireless stations as described in greater detail by the flowchart of FIG. 16. The routine then proceeds to step 307 to determine if the destination node is a null. If "Yes", then the routine terminate at step 314. If "No", then the routine proceeds to step 308 to execute the AnalyzeDestinationNodeData( ) routine to analyze the data related to the destination node in more detail stations as described in greater detail by the flowchart of FIG. 18.

The routine next proceeds to step 309 to determine if the source node is a null. If "Yes", it terminates at step 314. If "No", then the routine proceeds to step 310 where it executes the AnalyzeSourceNodeData( ) routine to analyze the data related to the source node in more detail, the stations being described in greater detail by the flowchart of FIG. 21. The next step is step 311 where the CheckAuthenticationAssociationAlarms( ) routine is executed as described in greater detail by the flowchart of FIG. 18.

The routine then proceeds to step 312 in order to determine if the frame type is a "Data Frame" and if the frame is not a duplicate. If "Yes", then it proceeds to step 313 to set the next layer of Expert Analysis to Data Link Control (DLC) layer. The IEEE802_11ParseFrame( ) routine is terminated at step 314.

With reference to FIG. 4, the program executes the CheckCRCAndPLCPErrorAlarms( ) routine (step 302 of FIG. 3) as denoted by steps 401 to 408. The role of this routine is to check if the current frame has Cyclical Redundancy Check (CRC), and Physical Convergence Layer Protocol (PLCP) errors. Both of these errors are serious in nature, and make further analysis impossible due to garbled frame content. The program initiates the CheckCRCAndPLCPErrorAlarms( ) routine at step 302. The routine then proceeds to step 401 to set the ulFrameStatus variable to the value returned by the GetFrameStatus( ) function. The details of this function are beyond the scope of this invention. The Network Interface Card (NIC) 81 determines certain parameters related to the frame that are not known from the contents of the frame including but not limited to error status, data rate, channel, and so forth.

The routine then proceeds to step 402 to determine if the frame has CRC error. If "Yes", the routine proceeds to step 403 to throw an alarm indicating CRC error. The details of alarm mechanism are proprietary to Network Associates, Inc. of Santa Clara, Calif., and beyond the scope of this invention. The routine then proceeds to step 404 to set variables holding the CRC error statistics. At step 404, the routine increments the ulBadCRCFrames counter by one, and sets the value of the outstanding frame type variable of the FrameACK_CTS state variable to none. This state variable is initialized at the beginning of the capture, and keeps track of ACK and CTS frames. The routine also sets the value of ulAlarmStatus variable to CRC at step 404 indicating that the frame has a CRC error. Then the routine ends at step 408.

If the result of step 402 is "No", the routine then proceeds to step 405 to determine if the current frame has a PLCP error. If "Yes", it proceeds to step 406 to throw a PLCP alarm. Then it proceeds to step 407 to increment the ulBadPLCPFrames counter by one. It also sets the value of the outstanding frame type variable of the FrameACK_CTS state variable to none. At step 407, the routine sets the ulAlarmStatus variable to PLCP that indicates the frame has a PLCP error. The CheckCRCAndPLCPErrorAlarms( ) routine of step 400 is terminated at step 408.

Figure 5:
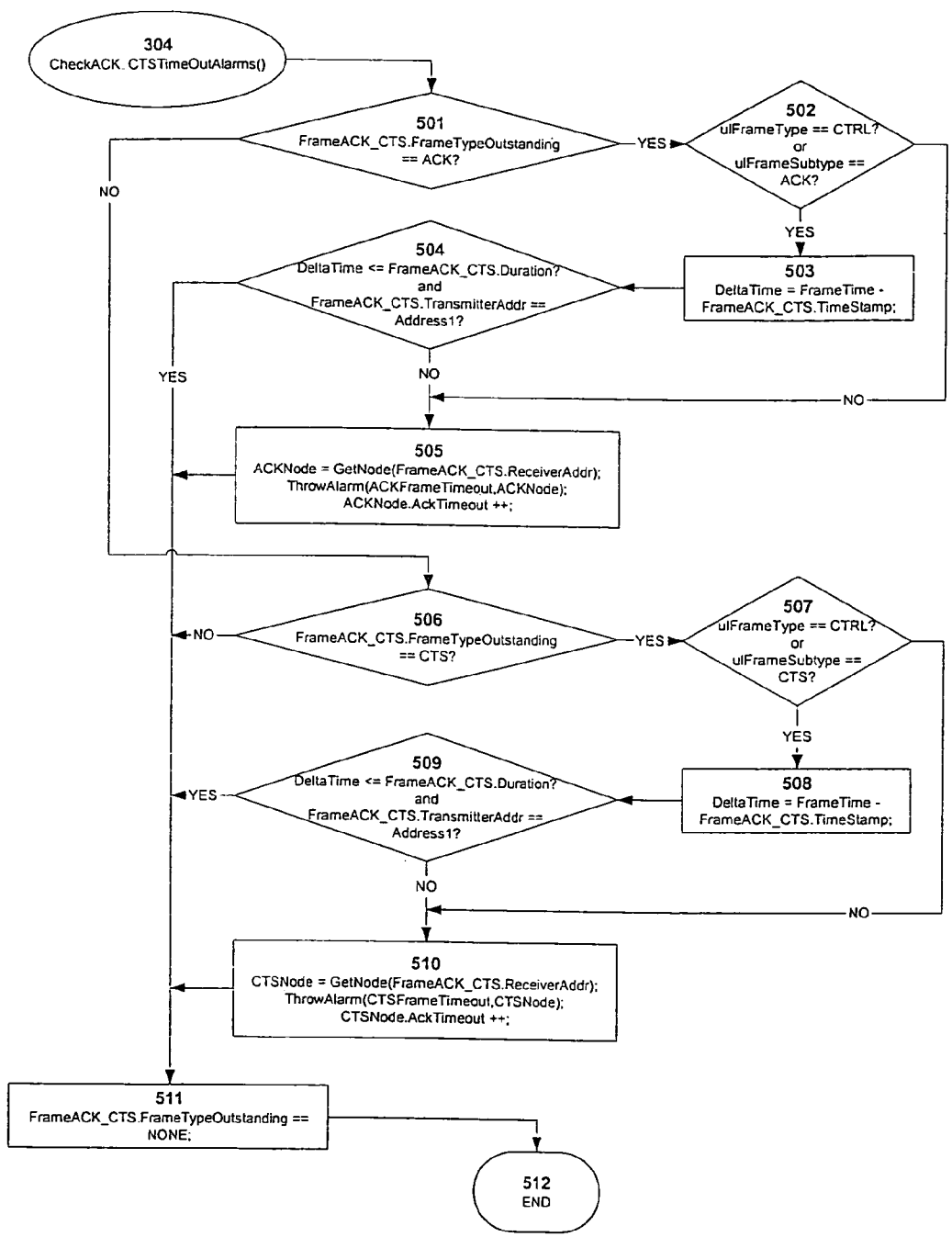
FIG. 5 shows a flowchart of a subroutine for checking alarms due to missing acknowledgment (ACK) and clear to send (CTS) frames associated with step 304 of the Expert Analysis routine of FIG. 3.

With reference to FIG. 5, the program executes the Check ACK_CTS TimeOut Alarms( ) routine (step 304 of FIG. 3) as denoted by steps 501 to 512. The role of this routine is to check if an alarm is to be generated due to a delayed or missing acknowledgment (ACK), and clear to send (CTS) frames. When a station sends a data or management frame to a unicast address, it expects an acknowledgment frame in return from that address. If the ACK frame arrives too late or never arrives this routine generates an alarm to notify the user. For some frames the sending station might want to ask the permission of the destined station to send a data frame. It accomplishes this by sending the request to send (RTS) frame. The receiving station responds with a clear to send (CTS) frame if it agrees to receive the frame. This routine also generates an alarm if the CTS frame arrives too late or never arrives. The program initiates the CheckACK_CTSTimeOutAlarms( ) routine at step 304.

The routine proceeds to step 501 to determine if the outstanding frame type is an ACK frame. If "Yes", it proceeds to step 502 to determine if the current frame type is a Control frame and the frame subtype is an ACK frame. If "Yes", it proceeds to step 503 to calculate the time difference between the current frame and the time of the last unicast data or management frame that requires an acknowledgment. It then proceeds to step 504 to check if the time difference calculated at step 503 is less than or equal to the duration field of the state variable frame ACT-CTS, and if the address of the transmitting station of the previous unicast data or management frame is equal to the Address 1 field 32 of the current frame. If the result of steps 502 and 504 are "No", the routine then proceeds to step 505 to generate an alarm for ACK frame timeout, and associates this alarm with the receiver of the previous unicast data or management frame. It also increments the variable of that station that holds the counts of ACK timeout alarms. The routine then proceeds to step 511.

If the result of step 504 is "Yes", the routine proceeds to step 511. If the result of step 501 is "No", the routine then proceeds to step 506 to determine if the outstanding frame type is a CTS frame. If "Yes", the routine proceeds to step 507 to determine if the current frame type is a control frame and the frame subtype is a CTS frame. If "Yes", then the routine proceeds to step 508 to calculate the time difference between the current frame and the time of the last RTS that requires a CTS frame. It then proceeds to step 509 to determine if the time difference calculated at step 508 is less than or equal to the duration field of state variable frame ACT-CTS. If the results of steps 509 and 507 are "No", the routine proceeds to step 510 to generate a CTS timeout alarm associated with the receiver of the previous RTS frame. It also increments the variable of that station that holds the counts of CTS timeout alarms. The routine then proceeds to step 511.

If the result of the step 506 is "No", the routine proceeds to step 511. If the result of step 509 is "Yes" the routine proceeds to step 511 where the outstanding frame type of the stat variable FrameACK_CTS is reset to none. The CheckACK_CTSTimeOutAlarms( ) routine ends at step 512.

As shown in FIG. 6, the program executes the AnalyzeFrameInDetail( ) routine 305 generally shown in FIG. 3. The AnalyzeFrameinDetail( ) routine is responsible for analyzing the contents of the frames in detail to determine certain parameters that will be used by the remainder of the program. After initiation at step 305, the routine than proceeds to step 601 to determine if the frame type is a Management frame. If "Yes", the routine proceeds to step 602 to execute the AnalyzeManagementFrameInDetail( ) routine to analyze the contents of management frames as described in greater detail by the flowchart of FIG. 7. The routine proceeds to terminate itself at step 607.

If the result of step 601 is "No", the routine proceeds to step 603 to determine if the frame type is a control frame. If "Yes", then it proceeds to step 604 to execute the AnalyzeControlFrameInDetail( ) routine to analyze the contents of management frames as described in greater detail by the flowchart of FIG. 14. The routine proceeds to step 607.

If the result of step 603 is "No", the routine proceeds to step 605 to determine if the frame type is a Data frame. If "Yes", the routine then proceeds to step 606 execute the AnalyzeDataFrameInDetail( ) routine to analyze the contents of management frames as described in greater detail by the flowchart of FIG. 15. The routine then proceeds to step 607. If the result of step 605 is "No", the routine proceeds to step 607. The AnalyzeFrameInDetail( ) routine terminates at step 607.

Figure 7:
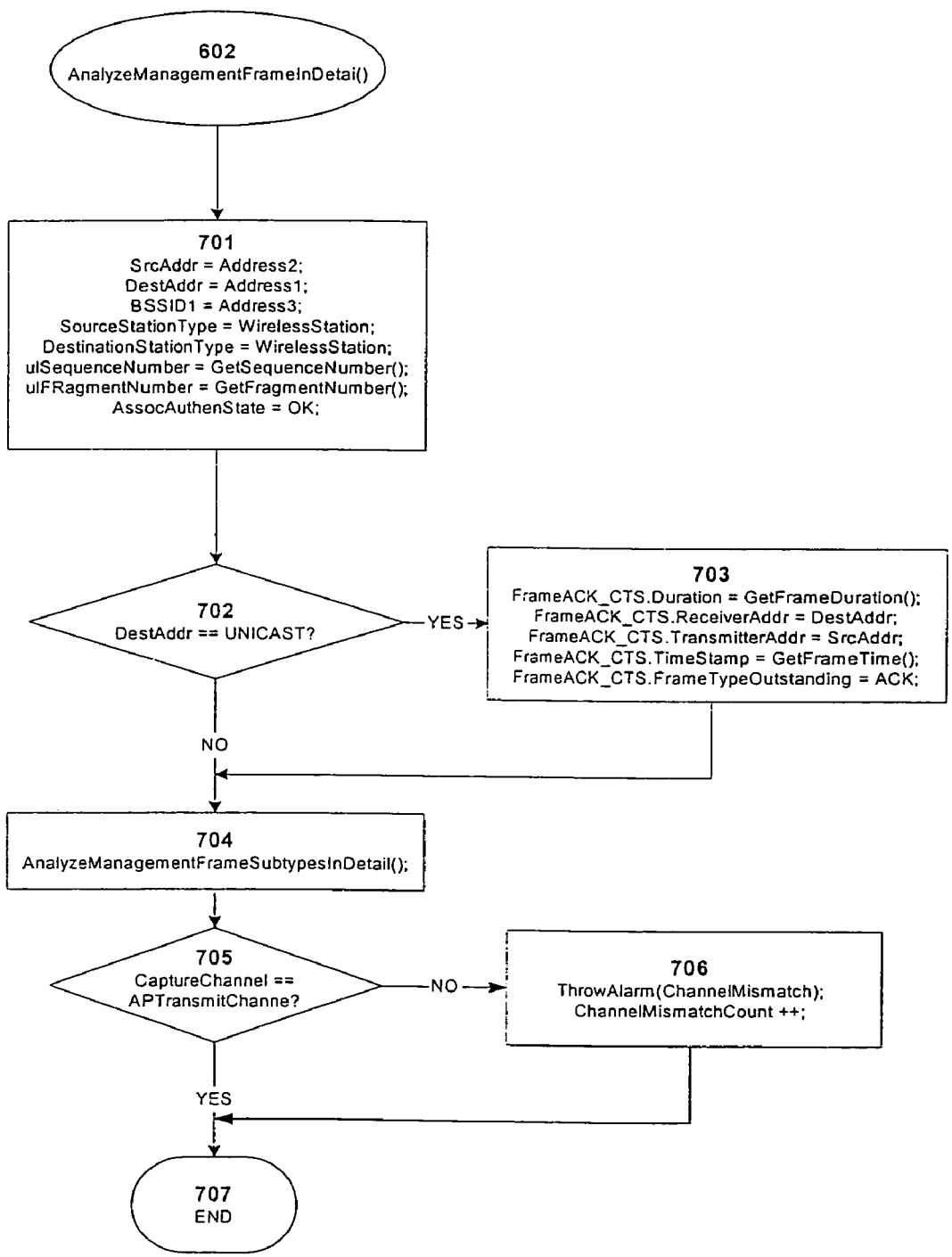
FIG. 7 shows a flowchart of a subroutine for analyzing in detail the management frames associated with step 602 of the Expert Analysis subroutine of FIG. 6.

As shown in FIG. 7, the program executes the AnalyzeManagementFrameInDetail( ) routine 602 generally shown in FIG. 6. The AnalyzeManagementFrameInDetail( ) routine is responsible for analyzing the contents of the management frames in detail to determine certain parameters that will be used by the remainder of the program. After initiation at step 602, the routine than proceeds to step 701 to initialize certain variables that will be used by the rest of the program. The SrcAddr variable is set to the contents of Address2 field 34. The DestAddr variable is set to the contents of the Address1 field 32. The BSSID1 variable is set to the contents of the Address3 field 36. The source station and destination station types are set as wireless stations 12. The ulSequenceNumber variable is set to the value returned the GetSequenceNumber( ) routine. The ulFragmentNumber variable is set to the value returned by the GetSequenceNumber( ) function. The details of these functions are beyond the scope of this invention. However, the sequence and fragment numbers are obtained from the Sequence Control field 40. The fragment number resides over the four least significant bits of the Sequence Control field 40. The sequence number resides the twelve most significant bits of the sequence control field 40. The routine initializes the value of the variable AssocAuthenState to OK.

The routine then proceeds to step 702 to determine if the DestAddr is a unicast address. If "Yes", the routine then proceeds to step 703 to set the contents of the state variable FrameACK_CTS. This state variable is used by the routine of the flowchart of FIG. 5 in step 510 to check if there is an alarm for ACK or CTS frame timeout. The FrameACK_CTS.Duration part is set to the duration field 30 of the current frame. The FrameACK_CTS.ReceiverAddr is set to the destination address of the current frame. The FrameACK_CTS.TransmitterAddr is set to the source address of the current frame. The FrameACK_CTS.TimeStamp is set to the time of the current frame. The routine also sets the type of the outstanding frame, FrameACK_CTS.FrameTypeOutstanding to ACK frame type.

The routine then proceeds to step 704. If the result of step 702 is "No", the routine proceeds to step 704 to execute the AnalyzeManagementFrameSubtypesInDetail( ) routine to further determine the variables needed by the rest of the program as described in greater detail by the flowchart of FIG. 8. The routine then proceeds to step 705 to determine if the channel that frame is captured on is the same as the access point transmit channel as determined by step 704. If "No", the routine proceeds to step 706 to generate an alarm for channel mismatch notifying the user that the frames received the access point are leaking into the capture channel. The routine also increments the variable that counts the number of channel mismatch alarms. The routine then proceeds to termination step 707. If the result of step 705 is "Yes", the routine proceeds to step 707. The AnalyzeManagementFrameInDetail( ) routine terminates at step 707.

Figure 8:
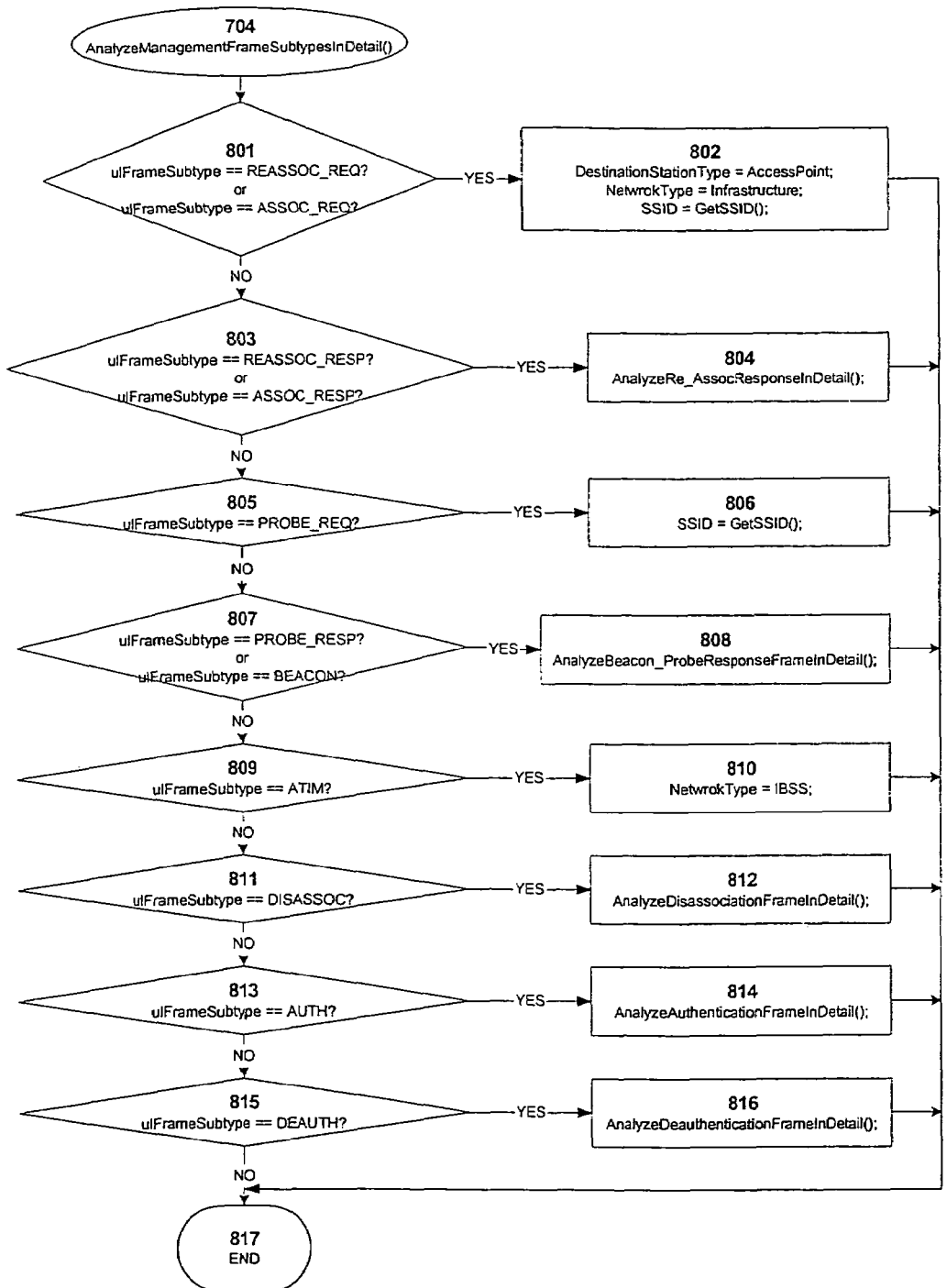
FIG. 8 shows a the flowchart of a subroutine for analyzing in detail the management subtype frames associated with step 704 of the subroutine of FIG. 7.

With reference to FIG. 8, the program executes the AnalyzeManagementFrameSubtypesInDetail( ) routine (step 704 of FIG. 7) as denoted by steps 801 to 817. The role of this routine is to analyze the contents of the Management Frame subtypes. Upon initiation of step 704, the routine proceeds to step 801 to determine if the frame subtype is either Association Request or Reassociation Request. If Yes, the routine then proceeds to step 802 to set the type of the destination station as an Access Point 14. The network type is set as Infrastructure. The variable SSID is set to the value returned by the GetSSID( ) function. The details of this function are beyond the scope of this invention. This function returns the octet string that identifies the service set (SSIID). The Association Request and Reassociation Request frames carry the SSID information element that holds the value of the octet string SSID field 2726 of FIG. 27B. The routine then proceeds to step 817.

If the result of step 801 is "No", the routine proceeds to step 803 to determine if the frame subtype is either association response or reassociation response. If "Yes," the routine proceeds to step 804 to execute the AnalyzeRe_AssocResponseInDetail( ) routine to analyze the contents of these frames in more detail as described in greater detail by the flowchart of FIG. 9. The routine then proceeds to step 817.

If the result of step 803 is "No", the routine then proceeds to step 805 to determine if the frame type is a Probe Request frame. If "Yes," the routine proceeds to step 806 to set the variable SSID to the contents of the SSID field 2726 of the SSID information element as depicted in FIG. 27B. The routine then proceeds to step 817.

If the result of the step 805 is "No," the routine proceeds to step 807 to determine if the frame type is either a Beacon or Probe response. If "Yes," the routine proceeds to step 808 to execute the AnalyzeBeacon_ProbeResponseFrameInDetail( ) routine to determine the parameters related for these frame types as described in greater detail by the flowchart of FIG. 10. The routine proceeds to step 817.

If the result of step 807 is "No," the routine proceeds to step 809 to determine if the frame subtype is an ATIM frame. If "Yes," the routine then proceeds to step 810 to set the value of the variable NetworkType to IBSS because this frame is used only in independent basic service set (Ad-hoc) networks. The routine then proceeds to step 817.

If the result of the step 809 is No, the routine proceeds to step 811 to determine if the frame subtype is a Disassociation frame. If Yes, the routine proceeds to step 812 to execute the AnalyzeDisassociationFrameInDetail( ) routine to analyze the contents of this frame subtype in more detail as described in greater detail by the flowchart of FIG. 11. The routine then proceeds to step 817.

If the result of the step 811 is "No," the routine proceeds to step 813 to determine if the frame subtype is an Authentication frame. If "Yes," the routine proceeds to step 814 to execute the AnalyzeAuthenticationFrameInDetail( ) routine to analyze the contents of this frame subtype in more detail as described in greater detail by the flowchart of FIG. 12. The routine then proceeds to step 817.

If the result of the step 813 is "No," the routine proceeds to step 815 to determine if the frame subtype is a Deauthentication frame. If "Yes," the routine proceeds to step 816 to execute the AnalyzeDeauthenticationFrameInDetail( ) routine to analyze the contents of this frame subtype in more detail as described in greater detail by the flowchart of FIG. 13. The routine then proceeds to step 817. The AnalyzeManagementFrameSubtypesInDetail( ) routine terminates at step 817.

Figure 9:
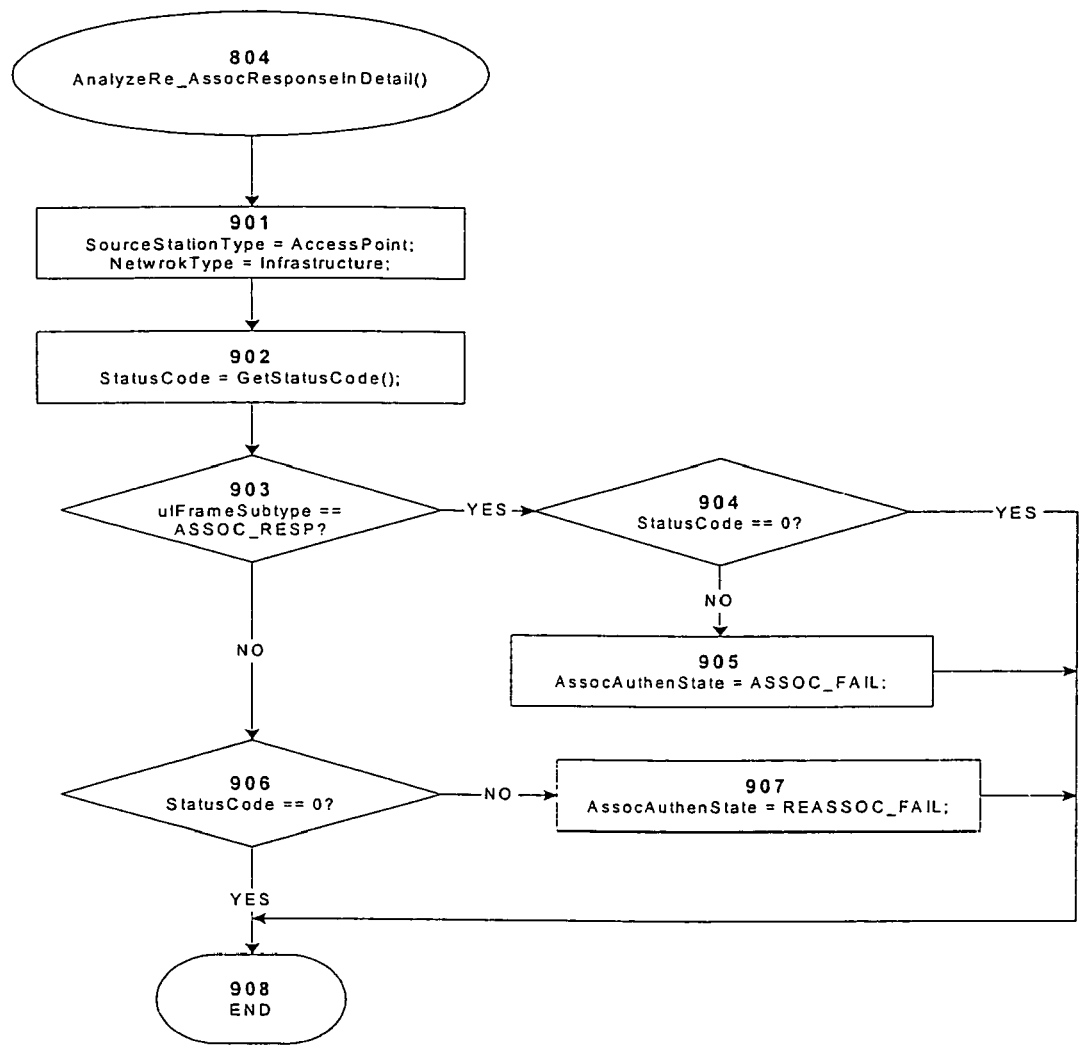
FIG. 9 shows the flowchart of a subroutine for analyzing in detail the association response and reassosciation response frames associated with step 804 of the subroutine of FIG. 8.

With reference to FIG. 9, the program executes the AnalyzeRe_AssocResponseInDetail( ) routine (step 804 of FIG. 8) as denoted by steps 901 to 908. The role of this routine is to analyze the contents of the Association Response and Reassociation Response frames. Upon initiation of step 804, the AnalyzeRe_AssocResponseInDetail( ) routine proceeds to step 901 where it sets the source station type to Access Point 14, and the network type to Infrastructure Network. The routine then proceeds to step 902 to set the variable StatusCode to the value returned by the GetStatus( ) function. The details of this function are beyond the scope of this invention. However, the GetStatusCode( ) function returns the value of the status code field 2606 of FIG. 26C. The meaning of the return values of the GetStatusCode( ) function is shown in Table 3.

The routine then proceeds to step 903 to determine if the frame subtype is an association response frame. If "Yes," the routine proceeds to step 904 to determine if the StatusCode is equal to zero. If "Yes," the routine proceeds to step 908.

If the result of step 904 is "No," the routine proceeds to step 905 where it sets the AssocAuthenState variable as "Association Failed". The routine then proceeds to step 908.

If the result of step 903 is "No," the routine proceeds to step 906 to determine if the value of the variable StatusCode is equal to zero. If "No," the routine then proceeds to step 907 to set the value of the variable AssocAuthenState to "Reassosciation Failed. The routine proceeds to step 908. If the result of the step 906 is "Yes", the routine then proceeds to step 908 where the AnalyzeRe_AssocResponseMnDetail( ) routine terminates.

TABLE 3

Status Codes

| Status Code | Code Translation |
|---|---|
| 0 | Successful |
| 1 | Unspecified failure |
| 2-9 | Reserved |
| 10 | Cannot support all requested capabilities in the Capability Information Field |
| 11 | Reassociation denied due to inability to confirm that association exists |
| 12 | Association denied due to reason outside of IEEE802.11 standard |
| 13 | Responding station does not support the specified authentication algorithm |
| 14 | Received an Authentication frame with authentication transaction sequence number out of expected sequence |
| 15 | Authentication rejected because of challenge failure |
| 16 | Authentication rejected due to timeout waiting for next frame in sequence |
| 17 | Association denied because Access Point is unable to handle additional associated stations |
| 18 | Association denied due to requesting station not supporting all of the data rates in the Basic Service Set Basic Rate Set. |
| 19 | Association denied due to requesting station not supporting Short Preamble option |
| 20 | Association denied due to requesting station not supporting PBCC Modulation option |
| 21 | Association denied due to requesting station not supporting Channel Agility option |
| 22-65535 | Reserved |

Figure 10:
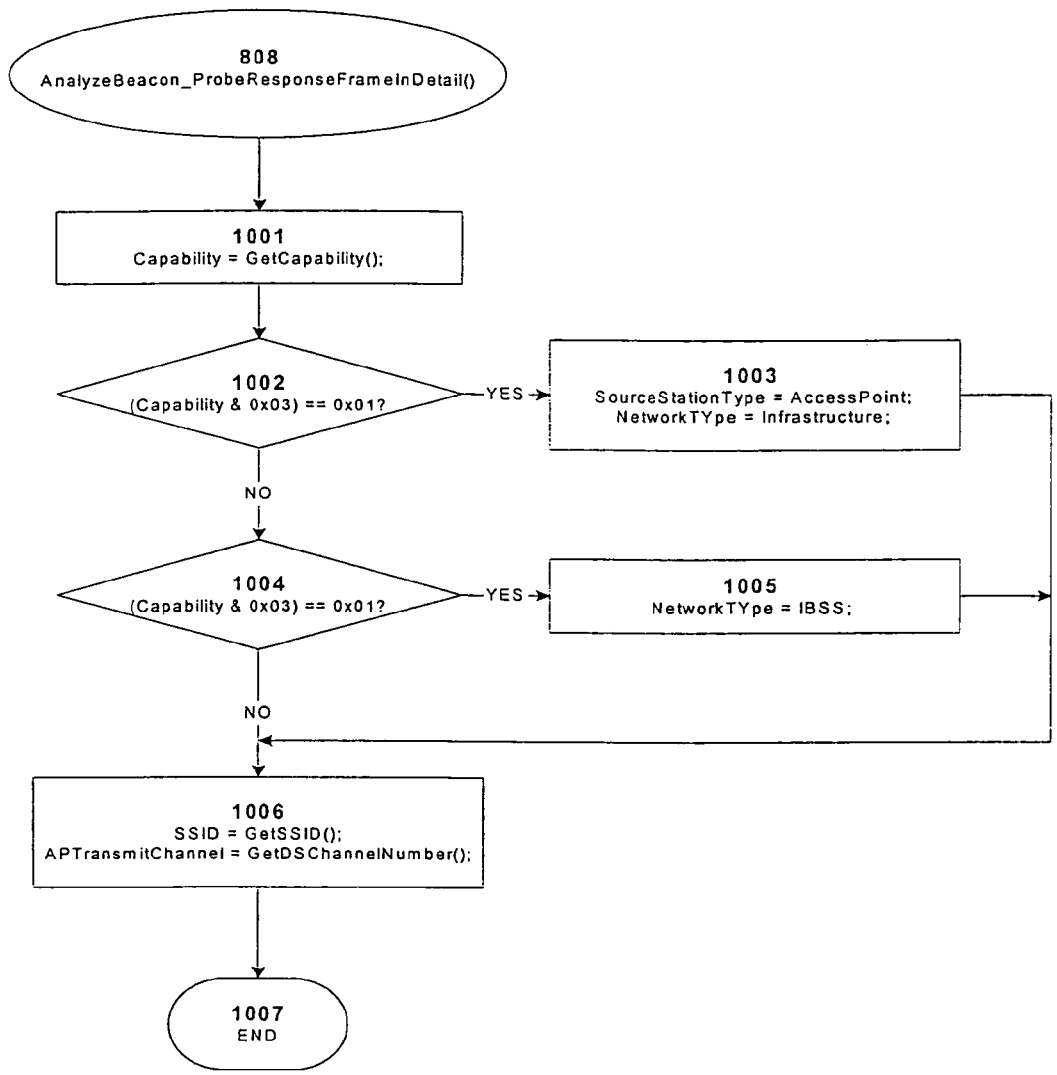
FIG. 10 shows the flowchart of a subroutine for analyzing in detail the beacon and probe response frames associated with step 808 of the subroutine of FIG. 8.

With reference to FIG. 10, the program executes the AnalyzeBeacon_ProbeResponseFrameInDetail( ) routine (step 808 of FIG. 8) as denoted by steps 1001 to 1007. The role of this routine is to analyze the contents of the Beacon and the Probe Request Frames. Upon initiation of step 808, the AnalyzeBeacon_ProbeResponseFrameInDetail( ) routine proceeds to step 1001 where it sets the variable Capability to the value returned by the GetCapability( ) function. The details of this function are beyond the scope of this invention. However, the GetCapability( ) function returns the value of the Capability information element as shown in FIG. 27A. The routine then proceeds to step 1002 to determine if the ESS bit field 2702 of the capability information element 2720 is set to one. If "Yes," the routine then proceeds to step 1003 to set the Source Station type to Access Point, and the network type to infrastructure networks. The routine then proceeds to step 1006.

If the result of the step 1002 is "No", the routine then proceeds to step 1004 to determine if the IBSS bit field 2704 of the capability information element 2720 is set to one. If "Yes," the routine proceeds to step 1005 to set to the value of the network type to IBSS. The routine then proceeds to step 1006.

If the result of the step 1004 is No, the routine proceeds to step 1006 where it sets to the value of the SSID variable to the value returned by the GetSSID( ) function. The value of the APTransmitChannel is set the value returned by the GetDSChannelNumber( ) function. The DS parameter set information element 2736 contains the current channel field 2734 that holds the channel Access Point operation on or activated as shown in FIG. 27C. GetDSChannelNumber( ) returns the channel number form the DS parameters information element 2736. The AnalyzeBeacon_ProbeResponseFrameInDetail( ) routine then proceeds to step 1007 where the AnalyzeBeacon_ProbeResponseFrameInDetail( ) routine terminates.

Figure 11:
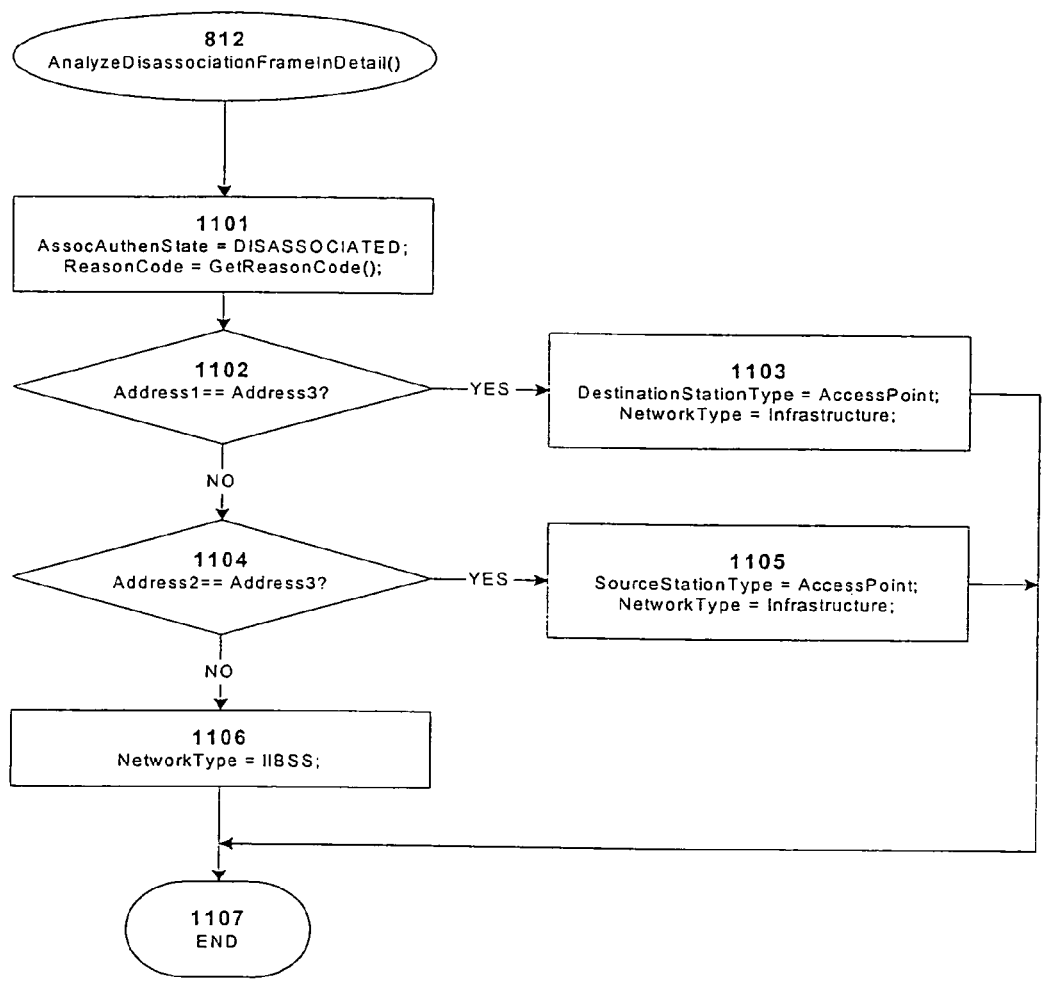
FIG. 11 shows the flowchart of a subroutine for step 812 of the subroutine of FIG. 8, for analyzing in detail the disassociation frames.

With reference to FIG. 11, the program executes the AnalyzeDisassociationFrameInDetail( ) routine (step 812 of FIG. 8) as denoted by steps 1101 to 1107. The role of this routine is to analyze the contents of the Disassociation frames. Upon initiation of step 808, the AnalyzeDisassociationFrameInDetail( ) routine proceeds to step 1101 where it sets the value of the variable AssocAuthenState to "Disassociated." The routine also sets the value of the variable ReasonCode to the value returned by the GetReasonCode( ) function. The details of this function are beyond the scope of this invention. However, the GetReasonCode( ) function returns the value of the reason code field 2604 of FIG. 26B. The meaning of the return values of the GetReasonCode( ) function is shown below in Table 4. The routine then proceeds to step 1102 to determine if the value of the Address1 field 32 is equal to the value of the Address3 field 36. If "Yes," the routine then proceeds to step 1103 to set the destination station type to Access Point, and the network type to Infrastructure networks. The routine then proceeds to step 1107.

If the result of the step 1102 is "No," the routine then proceeds to step 1104 to determine if the value of the Address2 field 34 is equal to the value of the Address3 field 36. If "Yes," the routine then proceeds to step 1105 to set the source station type to Access Point, and the network type to Infrastructure networks. The routine then proceeds to step 1107. If the result of the step 1104 is "No," the routine proceeds to step 1106 where it sets the value of the network type to IBSS. The routine then proceeds to step 1107 where the AnalyzeDisassociationFrameInDetail( ) routine terminates.

TABLE 4

Reason Codes

| Reason code | Translation of Code |
|---|---|
| 0 | Reserved |
| 1 | Unspecified reason |
| 2 | Previous authentication no longer valid |
| 3 | Deauthenticated because sending station is leaving (or has left) IBSS or ESS |
| 4 | Disassociated due to inactivity |
| 5 | Disassociated because Access Point is unable to handle all currently associated stations |
| 6 | Class 2 frame received from nonauthenticated station |
| 7 | Class 3 frame received from nonassociated station |
| 8 | Disassociated because sending station is leaving (has left) BSS |
| 9 | Station requesting (re)association is not authenticated with responding station |
| 10-65535 | Reserved |

Figure 12:
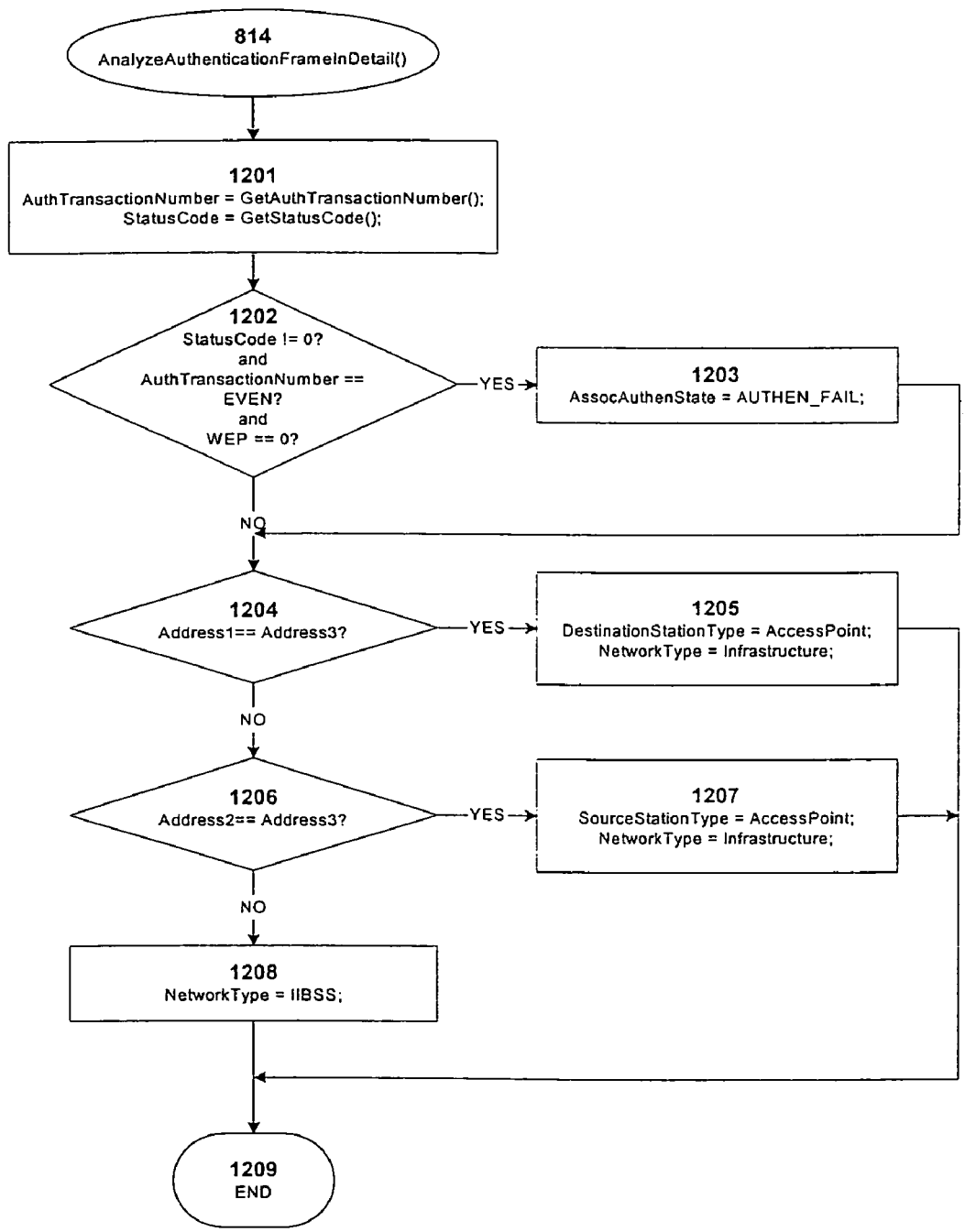
FIG. 12 shows the flowchart of a subroutine for step 814 of the subroutine of FIG. 8, for analyzing in detail the authentication frames.

With reference to FIG. 12, the program executes the AnalyzeAuthenticationFrameInDetail( ) routine (step 814 of FIG. 8) as denoted by steps 1201 to 1209. The role of this routine is to analyze the contents of the Authentication frames. Upon initiation of step 814, the AnalyzeAuthenticationFrameInDetail( ) routine proceeds to step 1201 where it sets the variable AuthTransactionNumber to the value returned by the GetAuthTransactionNumber( ) function. The detail of this function is beyond the scope of this invention. However, it returns the value of the authentication transaction sequence number information element 2602 as shown in FIG. 26A. It also sets the variable StausCode to the value returned by the GetStatusCode( ) function. The details of this function are beyond the scope of this invention. However, the GetStatusCode( ) function returns the value of the status code field 2606 of FIG. 26C. The meaning or translation of the return values of the GetStatusCode( ) function is shown above in Table 3. The routine then proceeds to determine if the value of the variable StatusCode is not equal to zero and the value of the variable AuthTransactionNumber is an even number and the WEP bit field 60 is equal to zero. If Yes, the routine proceeds to step 1203 to set the value of the variable AssocAuthenState to "Authentication Failed." The routine then proceeds to step 1204.

If the result of the step 1202 is "No", the routine then proceeds to step 1204 to determine if the value of the Address1 field 32 is equal to the value of the Address3 field 36. If "Yes", the routine then proceeds to step 1205 to set the destination station type to Access Point, and the network type to Infrastructure networks. The routine then proceeds to step 1209.

If the result of the step 1204 is "No", the routine then proceeds to step 1206 to determine if the value of the Address2 field 34 is equal to the value of the Address3 field 36. If "Yes", the routine then proceeds to step 1207 to set the source station type to Access Point, and the network type to Infrastructure networks. The routine then proceeds to step 1209.

If the result of the step 1104 is "No", the routine proceeds to step 1208 where it sets the value of the network type to IBSS. The routine then proceeds to step 1209 where the AnalyzeAuthenticationFrameInDetail( ) routine terminates.

Figure 13:
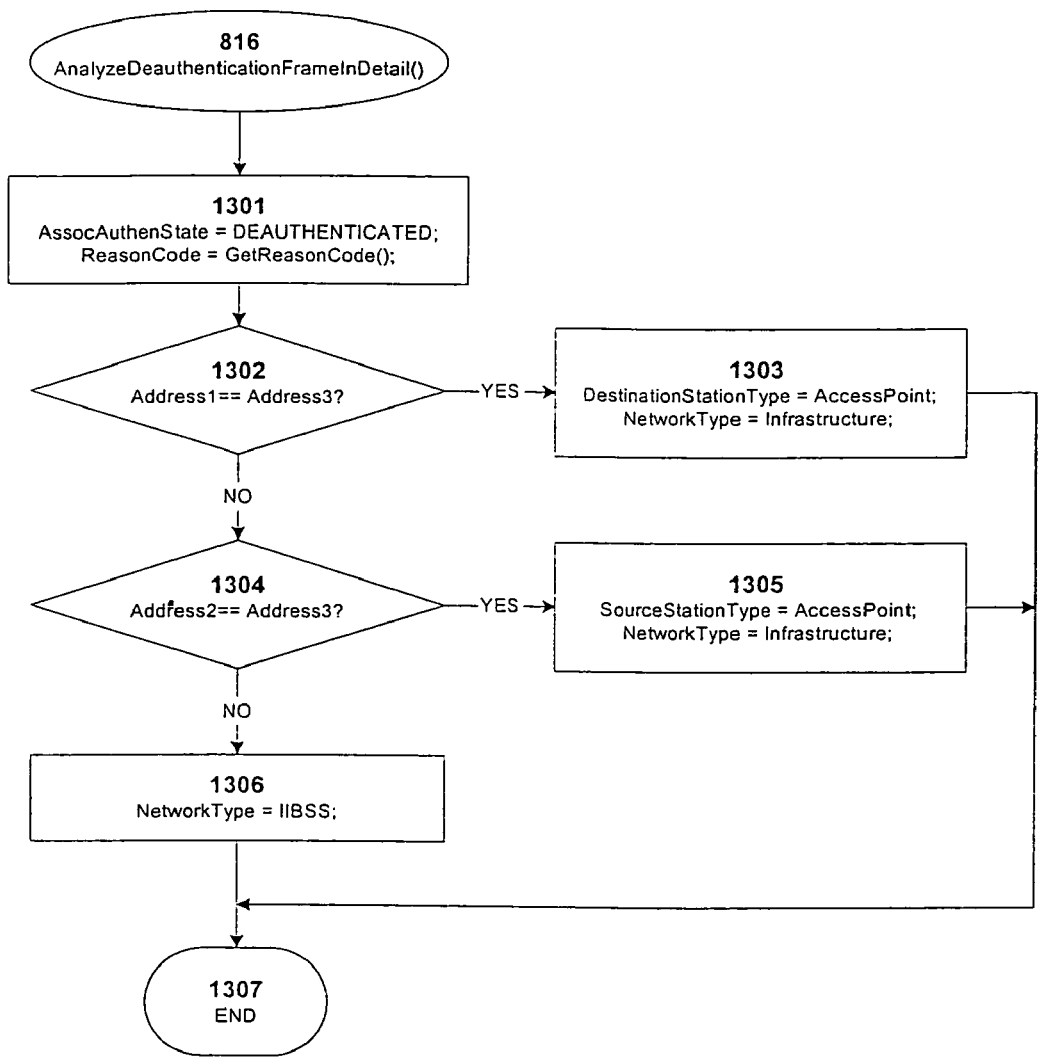
FIG. 13 shows the flowchart of a subroutine for step 816 of the subroutine of FIG. 8, for analyzing in detail the deauthentication frames.

With reference to FIG. 13, the program executes the AnalyzeDeauthenticationFrameInDetail( ) routine (step 816 of FIG. 8) as denoted by steps 1301 to 1307. The role of this routine is to analyze the contents of the Deauthentication frames. Upon initiation of step 816, the AnalyzeDeauthenticationFrameInDetail( ) routine proceeds to step 1301 where it sets the value of the variable AssocAuthenState to "Deauthenticated." The routine also sets the value of the variable ReasonCode to the value returned by the GetReasonCode( ) function. The details of this function are beyond the scope of this invention. However, the GetReasonCode( ) function returns the value of the reason code field 2604 of FIG. 26B. The meaning of the return values of the GetReasonCode( ) function is shown above in Table 4.

The routine then proceeds to step 1302 to determine if the value of the Address1 field 32 is equal to the value of the Address3 field 36. If "Yes," the routine then proceeds to step 1303 to set the destination station type to Access Point, and the network type to Infrastructure networks. The routine then proceeds to step 1307.

If the result of the step 1302 is "No," the routine then proceeds to step 1304 to determine if the value of the Address2 field 34 is equal to the value of the Address3 field 36. If "Yes", the routine then proceeds to step 1305 to set the source station type to Access Point, and the network type to Infrastructure networks. The routine then proceeds to step 1307. If the result of the step 1304 is "No", the routine proceeds to step 1306 where it sets the value of the network type to IBSS. The routine then proceeds to step 1107 where the AnalyzeDeauthenticationFrameInDetail( ) routine terminates.

Figure 14:
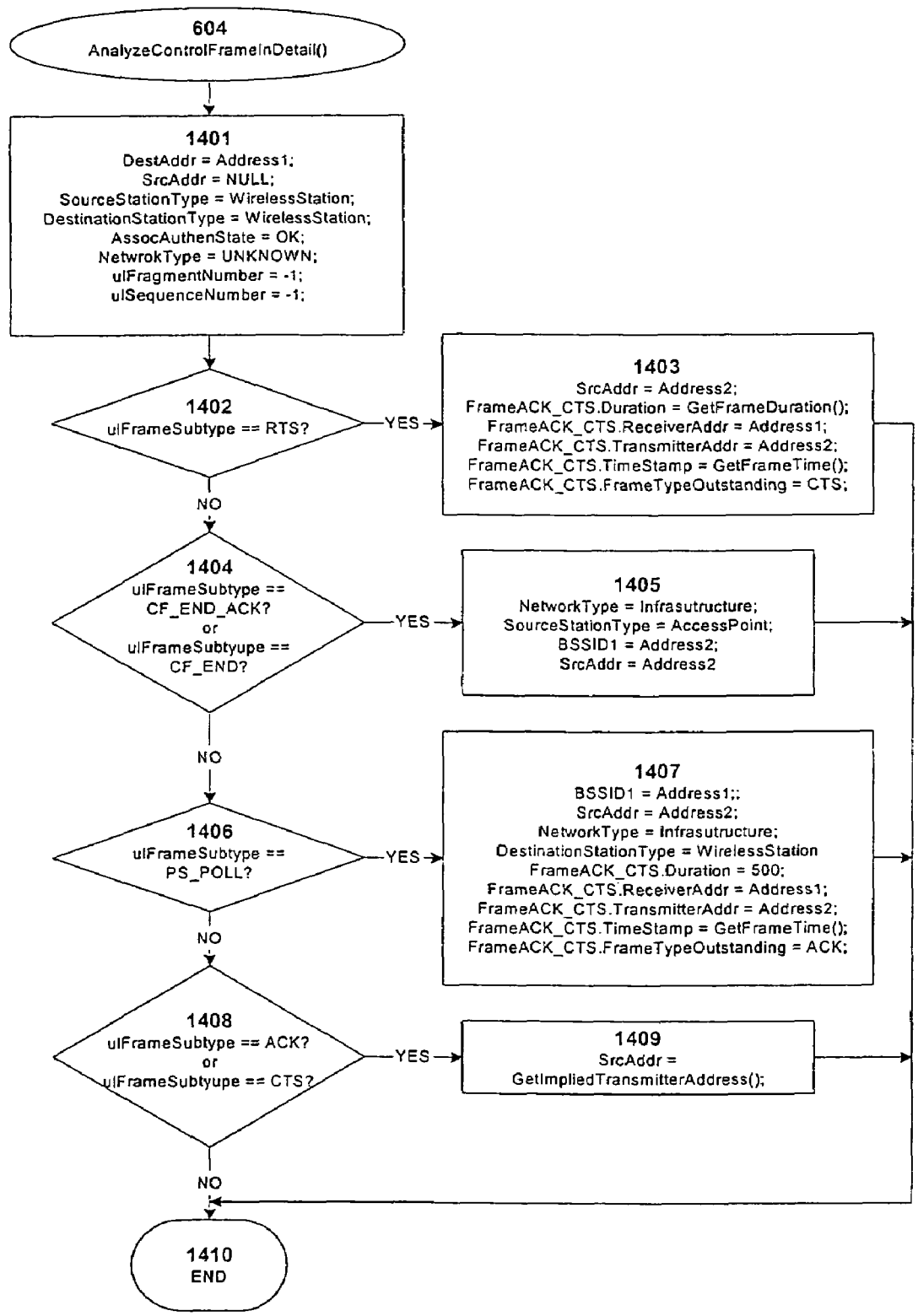
FIG. 14 shows the flowchart of a subroutine for step 604 of the subroutine of FIG. 6, for analyzing in detail the control frames.

With reference to FIG. 14, the program executes the AnalyzeControlFrameInDetail( ) routine (step 604 of FIG. 6) as denoted by steps 1401 to 1410. The role of this routine is to analyze the contents of the Control Frames and to determine the parameters necessary for further Expert Analysis of the wireless layer. Upon initiation of step 604, the AnalyzeControlFrameInDetail( ) routine proceeds to step 1401 where it initializes certain parameters. At step 1401, the routine sets the value of the variable DestAddr to the value of Address1 field 32. The value of the variable SrcAddr is initialized to null, because some Control Frame subtype may not have a source address. The routine initializes source and destination station types to wireless station. The AssocAuthenState is initialized to OK. The network type is initialized to unknown. The values of the variables ulFragmentNumber and ulSequence number are initialized to negative 1 indicating the Control frames do not have sequence control field 40.

The routine then proceeds to step 1402 to determine if the frame subtype is an RTS frame. If "Yes", the routine proceeds to step 1403 to set the value of the variable SrcAddr to the value of the Address2 field 34. The routine also sets the various fields of the state variable FrameACK_CTS. This state variable is used by the flowchart of FIG. 5 to check if there is an alarm for ACK or CTS frame timeout. The FrameACK_CTS.Duration part is set to the duration field 30 of the current frame. The FrameACK_CTS.ReceiverAddr is set to the value of the Address1 field 32 of the current frame. The FrameACK_CTS.TransmitterAddr is set to the value of the Address2 field 34 of the current frame. The FrameACK_CTS.TimeStamp is set to the time of the current frame. The routine also sets the type of the outstanding frame, FrameACK_CTS.FrameTypeOutstanding to CTS frame type. The routine then proceeds to terminate at step 1410.

If the result of step 1402 is "No", the routine proceeds to step 1404 to determine if the frame subtype is either a CF-END or CF-END-ACK frame. If "Yes", the routine proceeds to step 1405 to set the network type to Infrasutructure networks and the source station type to Access Point. The value of the variable BSSID1 is set to the value of the Address2 field 34. The value of the variable SrcAddr is set to the contents of the Address2 field 34 also. The routine then proceeds to step 1410.

If the result of step 1404 is "No", the routine proceeds to step 1406 to determine if the frame subtype is a PS_POLL frame. If "Yes", the routine proceeds to step 1407 to set certain variables. It sets the value of the variable BSSID1 to the value of the Address1 field 32. It sets the value of the variable SrcAddr to the value of the Address2 field 34. The network type is set to Infrastructure networks. The routine sets the Destination Station type to Wireless Station. The routine also sets the various fields of the state variable FrameACK_CTS. This state variable is used by the flow chart of FIG. 5 to check if there is an alarm for ACK or CTS frame timeout. The FrameACK_CTS.Duration part is set to 500 microseconds. The FrameACK_CTS.ReceiverAddr is set to the value of the Address1 field 32 of the current frame. The FrameACK_CTS.TransmitterAddr is set to the value of the Address2 field 34 of the current frame. The FrameACK_CTS.TimeStamp is set to the time of the current frame. The routine also sets the type of the outstanding frame, FrameACK_CTS.FrameTypeOutstanding to ACK frame type. The routine then proceeds to step 1410.

If the result of step 1406 is "no", the routine then proceeds to step 1408 to determine if the frame subtype is either an ACK frame or a CTS frame. If "Yes", the routine proceeds to step 1409 to set the value of the variable SrcAddr to the value returned by the GetImpledTransmitterAddress( ) function. Since the ACK and CTS frames do not carry the source address of the transmitting station. The software inside the Network Interface Card (NIC) 81 tries to determine the address of the transmitting station for the ACK and CTS frames. If it can determine the address of the transmitting station, the GetImpledTransmitterAddress( ) function returns a valid address, otherwise it returns null. The details of determining the address of the transmitting station for the ACK and CTS frames are beyond the scope of this invention, and are covered by co-pending Ser. No. 09/875,544 shown above as a Related Application. The routine then proceeds to step 1410. If the result of step 1408 is "No", the routine proceeds to step 1410 where the AnalyzeControlFrameInDetail( ) routine terminates.

Figure 15:
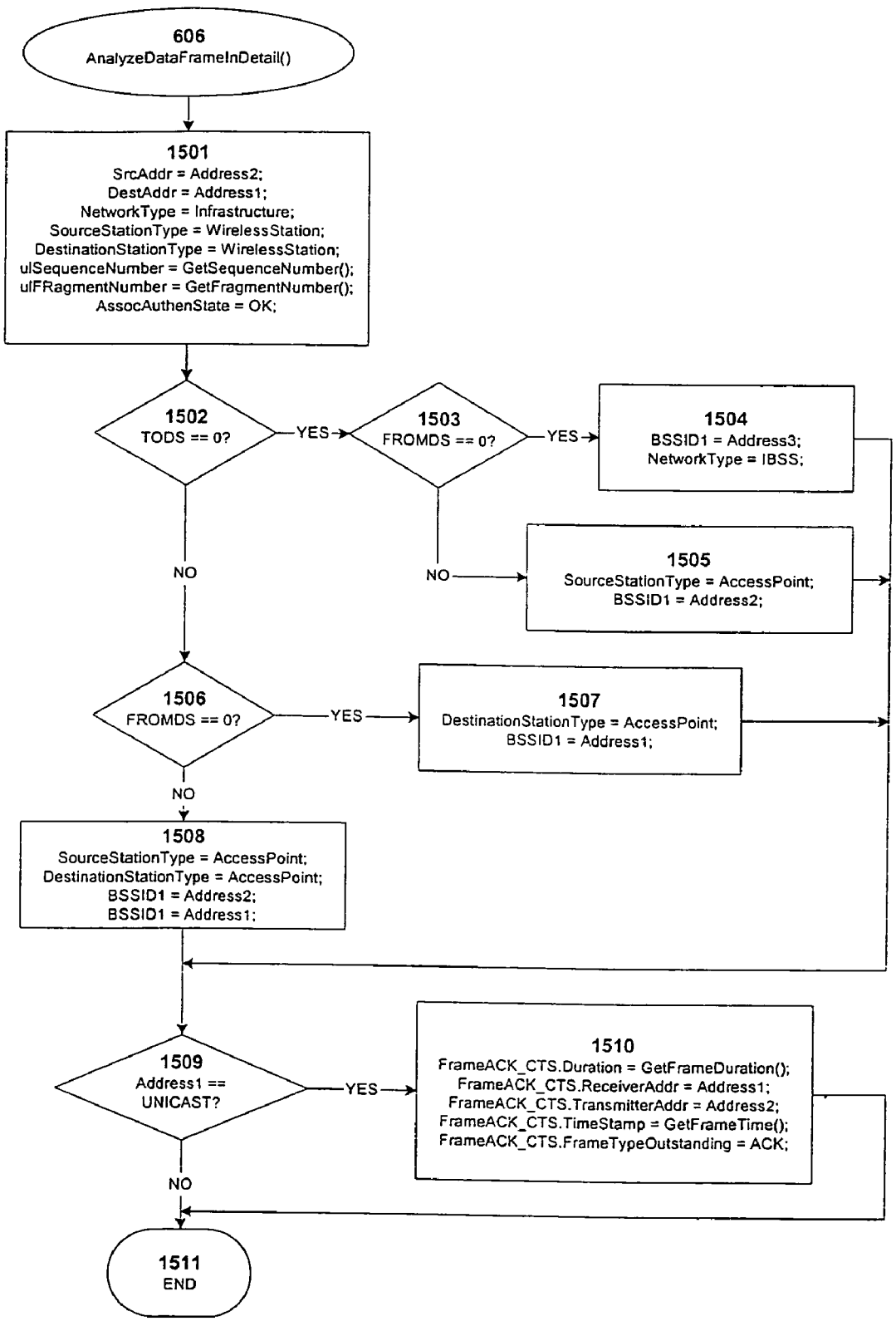
FIG. 15 shows the flowchart of a subroutine for step 606 of the subroutine of FIG. 6, for analyzing in detail the data frames.

With reference to FIG. 15, the program executes the AnalyzeDataFrameInDetail( ) routine (step 606 of FIG. 6) as denoted by steps 1501 to 1511. The role of this routine is to analyze the contents of the data frames and to determine the parameters necessary for further Expert Analysis of the wireless layer. Upon initiation of step 606, the AnalyzeDataFrameInDetail( ) routine proceeds to step 1501 where it initializes certain parameters. At step 1501, the routine sets the value of the variable SrcAddr to the value of Address2 field 34, and it sets the value of the variable DestAddr to the value of Address1 field 32. The network type is initialized to Infrastructure Networks. The routine initializes Source and Destination Station types to Wireless Station. The routine sets the value of the variable ulSequencenumber to the value returned by the GetSequenceNumber( ) function. The value of the ulFragmentNumber is set to the value returned by the GetFragmentNumber( ) function. The AssocAuthenStae is initialized to OK.

The routine then proceeds to step 1502 to determine if the "ToDS" bit field 48 is equal to zero. If "Yes", the routine then proceeds to step 1503 to determine if the "FromDS" bit field 50 is equal to zero. If "Yes", the routine proceeds to step 1504 where the value of the variable BSSID1 is set to the value of the Address3 field 36. At step 1504, the routine also sets the network type to IBSS. The routine proceeds to step 1509.

If the result of step 1503 is "No", the routine proceeds to step 1505, where it sets the source station type to Access Point. The value of the BSSID1 field is set to the value of the Address2 field 32. The routine proceeds to step 1509.

If the result of step 1502 is "No", the routine proceeds to step 1506 to determine if the "FromDS" bit field 50 is equal to zero. If "Yes", it proceeds to step 1507 set the destination station type to Access Point. It also sets the value of the variable BSSID1 to the value of the Address1 field 32. The routine proceeds to step 1509.

If the result of step 1506 is "No", the routine proceeds to step 1508 to set the source and destination station types to Access Point. It also sets the values of the variables BSSID1 and BSSID2 to the values of the Address2 field 34 and Address1 field 30, respectively.

The routine then proceeds to step 1509 to determine if the value of the Address1 field 32 is a unicast address. If "Yes", the routine proceeds to step 1510 to set the various fields of the state variable FrameACK_CTS. This state variable is used by the flowchart of FIG. 5 to check if there is an alarm for ACK or CTS frame timeout. The FrameACK_CTS.Duration part is set to the value of the duration field 30 of the current frame. The FrameACK_CTS.ReceiverAddr is set to the value of the Address1 field 32 of the current frame. The FrameACK_CTS.TransmitterAddr is set to the value of the Address2 field 34 of the current frame. The FrameACK_CTS.TimeStamp is set to the time of the current data frame. The routine also sets the type of the outstanding frame, FrameACK_CTS.FrameTypeOutstanding to ACK frame type. The AnalyzeDataFrameInDetail( ) routine terminates at step 1511.

Figure 16:
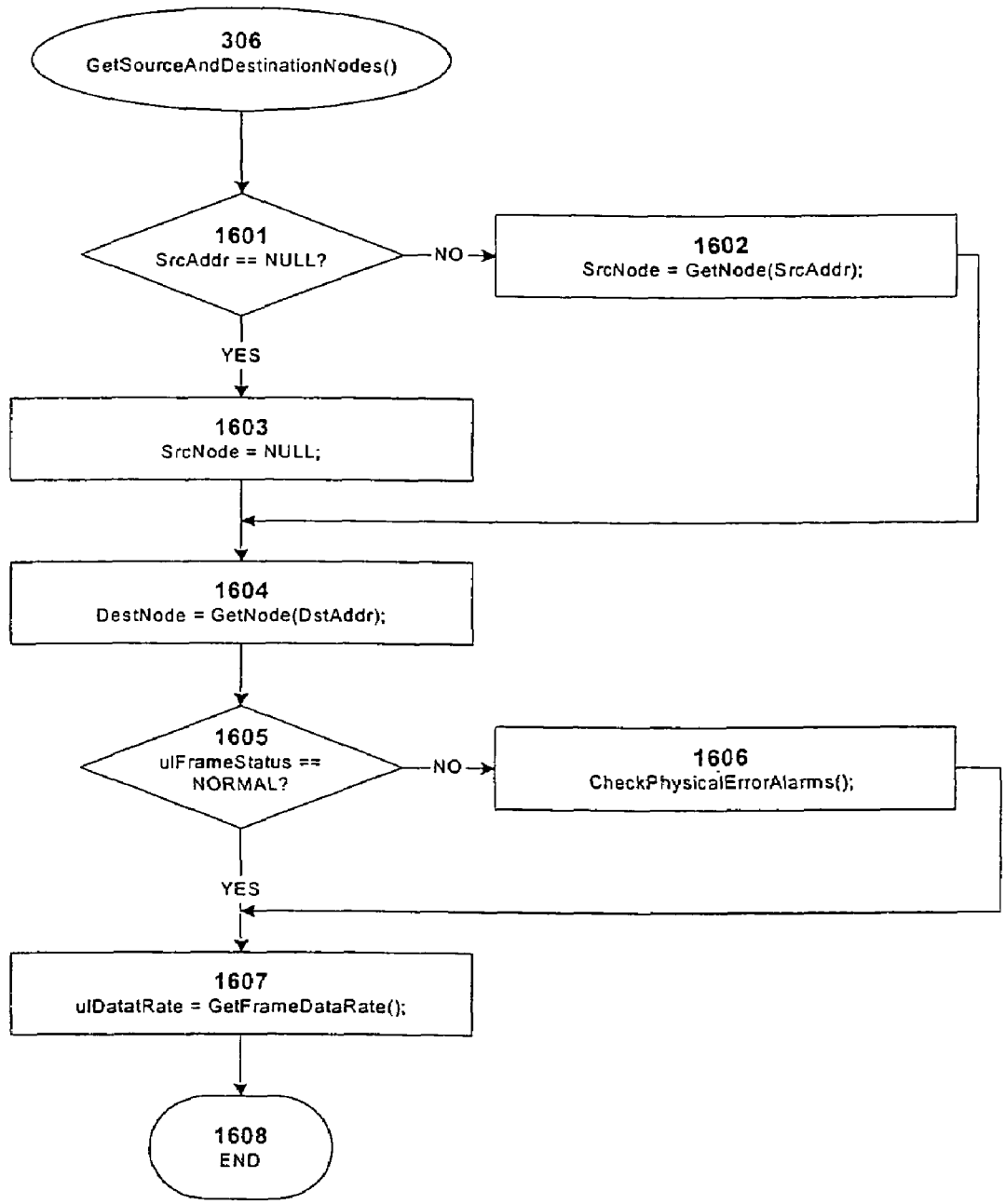
FIG. 16 shows the flowchart of a subroutine for step 305 of the subroutine of FIG. 3, for creating objects that represent the source and destination modes.

With reference to FIG. 16, the program executes the GetSourceAndDestinationNodes( ) routine (step 306 of FIG. 3) as denoted by steps 1601 to 1608. The role of this routine is to get a handle for the source and destination nodes. The source and destination nodes are objects that contain variables that hold certain parameters and statistics for these nodes. For example, each object contains variables that hold the SSID and BSSID the node belongs to, several counters that keep track of octets and frames transmitted from and received by the station categorized according to the data rates, and several more. The following flowcharts will show how the variables of a node are updated. These nodes represent the logical view of the network in terms of the wireless stations. Upon initiation of step 306, the GetSourceAndDestinationNodes( ) routine proceeds to step 1601 to determine if the variable SrcAddr contains a null value. If "No", the routine proceeds to step 1602, where it sets the value of the SrcNode to the value returned by the GetNode( ) function. The implementation details of this function are beyond the scope of this invention. The GetNode( ) function takes the MAC address of the station as an input parameter and returns a handle to the station object representing the station. If the station object has already been created by the analysis of the earlier frames, the GetNode( ) function simply returns a handle to the station object. If the address of the station is seen for the first time, the GetNode( ) function creates a new wireless station object, resets all of the variables contained by this node object, and returns its handle. If on the other hand a new object cannot be created due to limited resources, it returns a value of null. After getting a handle to the source station object at step 1602, the routine proceeds to step 1604.

If the result of step 1601 is "Yes", the routine proceeds to step 1603 to set the value of the variable SrcNode to null indicating an unknown source station object. The routine then proceeds to step 1604 to get the destination node by calling the GetNode( ) function. The routine proceeds to step 1605 to determine if the status of the frame as determined by the Network Interface Card (NIC) 81 is normal. If "No", the routine then proceeds to step 1606 to execute the CheckPhysicalErrorAlarms( ) routine in order to check what physical errors exist and generate the corresponding alarms as described in detail by the flowchart of FIG. 17. The routine then proceeds to step 1607.

If the result of step 1605 is "Yes", the routine proceeds to step 1607 to set the value of the variable ulDataRate to the value returned by the GetFrameDataRate( ) function. The details of this function are beyond the scope of this function. However, the GetFrameDataRate( ) function returns the data rate of the frame as determined by the Network Interface Card (NIC) 81 at the time of the capture of the frame. The possible values of data rates according to the IEEE802.11b standard are 1 Mbit/second, 2 Mbit/second, 5.5 Mbit/second and 11 Mbit/second. The routine then proceeds to step 1607 where the GetSourceAndDestinationNodes( ) routine terminates.

Figure 17:
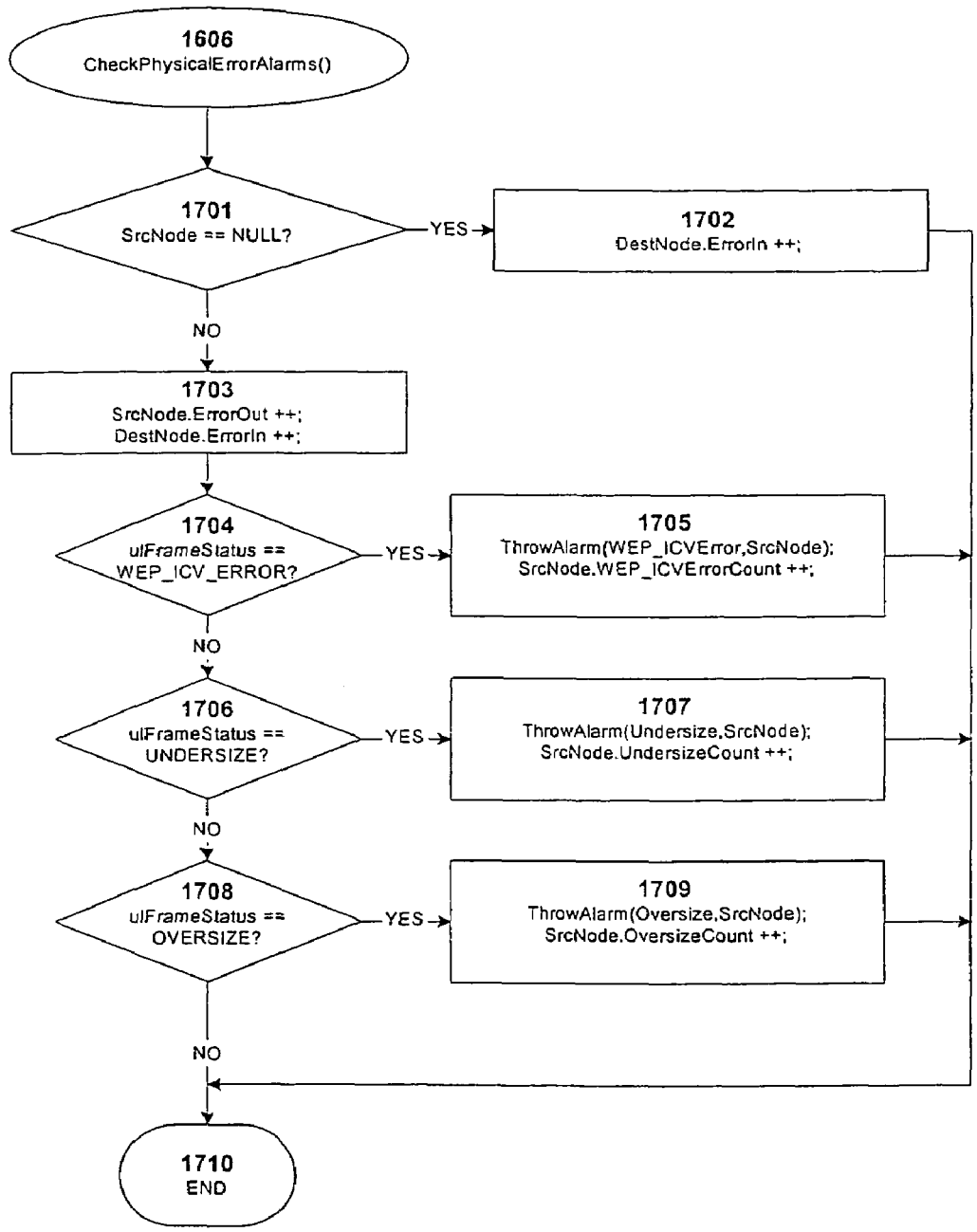
FIG. 17 shows the flowchart of a subroutine for step 1606 of FIG. 16 for checking alarms due to physical errors of the frames.

With reference to FIG. 17, the program executes the CheckPhysicalErrorAlarms( ) routine (step 1606 of FIG. 16) as denoted by the steps 1701 to 1710. The role of this routine is to check for physical errors associated with the frame and to generate related alarms. Upon initiation of step 106, the CheckPhysicalErrorAlarms( ) routine proceeds to step 1701 to determine if the value of the variable SrcNode is equal to null. If "Yes", the routine proceeds to step 1702 to increment the variable belonging to the DestNode object that counts the number of errored frames destined for this station. The routine proceeds to terminate at step 1710.

If the result of step 1701 is "No", the routine proceeds to step 1703 and increments the variables SrcNode.ErrorOut and DestNode.ErrorIn. The routine then proceeds to step 1704 to determine if the ulFrameStatus is equal to WEP-ICV error. If "Yes", the routine proceeds to step 1705 where it generates a WEP-ICV alarm. It also increments the variable SrcNode.WEP_ICVErrorCount by one. WEP-ICV error happens if the key used by the network tool 80 to decrypt the frames does not mach to the keys used by the source station to encrypt them. The routine proceeds to step 1710.

If the result of step 1704 is "No", the routine proceeds to step 1706 to determine if the ulFrameStatus is equal to Undersize Error. If "Yes", the routine proceeds to step 1707 where it generates an undersize alarm. It also increments the variable SrcNode.UndersizeCount by one. The routine then proceeds to step 1710.

If the result of step 1706 is "No", the routine proceeds to step 1708 to determine if the ulFrameStatus is equal to oversize error. If "Yes", the routine proceeds to step 1709 where it generates an aversize alarm. It also increments the variable SrcNode.OversizeCount by one. The routine then proceeds to step 1710. If the result of the step 1708 is "No", the routine proceeds to step 1710 where the CheckPhysicalErrorAlarms( ) routine terminates.

Figure 18:
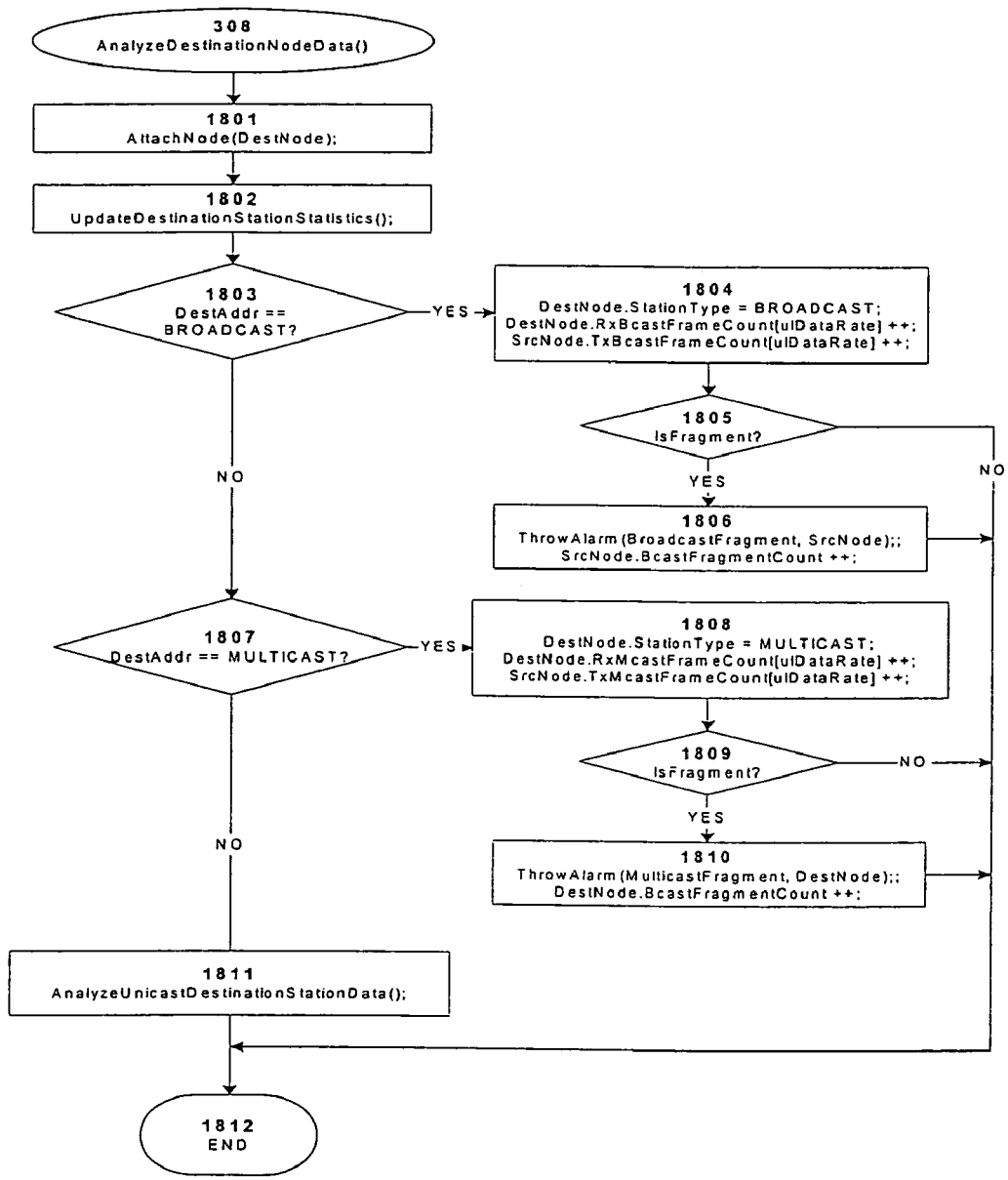
FIG. 18 shows the flowchart of a subroutine for step 308 of FIG. 3, for analyzing in detail the data related to the destination stations.

With reference to FIG. 18, the program executes the AnalyzeDestinationNodeData( ) routine (step 308 of FIG. 3) as denoted by the steps 1801 to 1812. The role of this routine is to analyze the data and parameters related to the Destination Node Object. Upon initiation of step 308, the AnalyzeDestinationNodeData( ) routine proceeds to step 1801 where it executes the AttachNode( ) function. The details of this function are beyond the subject of this invention. The AttachNode( ) function takes the destination node object as a parameter and attaches it to the link created between the wireless layer and higher protocol layers. The link between the wireless and higher layer protocols can be seen in the field 3014 of FIG. 30. The routine proceeds to step 1802 to execute the UpdateDestinationStationStatistics( ) routine to update the frame and octet counts associated with the destination node object as described in greater detail by the flowchart of FIG. 19. The routine then proceeds to step 1803 to determine if the destination address is Broadcast address. If "Yes", the routine proceeds to step 1804 to set the variable DestNode.StationType to Broadcast. It also increments the variables DestNode.RxBcastFrameCount[ulDataRate] and SrcNode.TxBcastFrameCount[ulDataRate] by one. These variables hold the counts of broadcast frames received by the destination station and transmitted by the source station at a particular data rate respectively.

The routine proceeds to step 1805 to determine if the frame is a fragment of a larger frame. If "Yes", the routine proceeds to step 1806 where it generates a fragmented broadcast frame alarm, and increments the variable DestNode.BcastFragmenCount by one. The IEEE802.11b standard states that broadcast and multicast frames can not be fragmented. The routine proceeds to termination step 1812. If the result of step 1805 is "No", the routine proceeds to step 1812.

If the result of the step 1803 is "No", the routine then proceeds to step 1807 to determine if the destination address is a Multicast Address. If "Yes", the routine proceeds to step 1808 to set the variable DestNode.StationType to Multicast. It also increments each of the variables DestNode.RxMcastFrameCount[ulDataRate] and SrcNode.TxMcastFrameCount[ulDataRate] by one. These variables hold the counts of Multicast frames received by the destination station and transmitted by the source station at a particular data rate.

The routine then proceeds to step 1809 to determine if the frame is a fragment of a larger frame. If "Yes", the routine proceeds to step 1810 where it generates a fragmented broadcast frame alarm, and increments the variable DestNode.McastFragmenCount by one. The routine then proceeds to step 1812.

Figure 20:
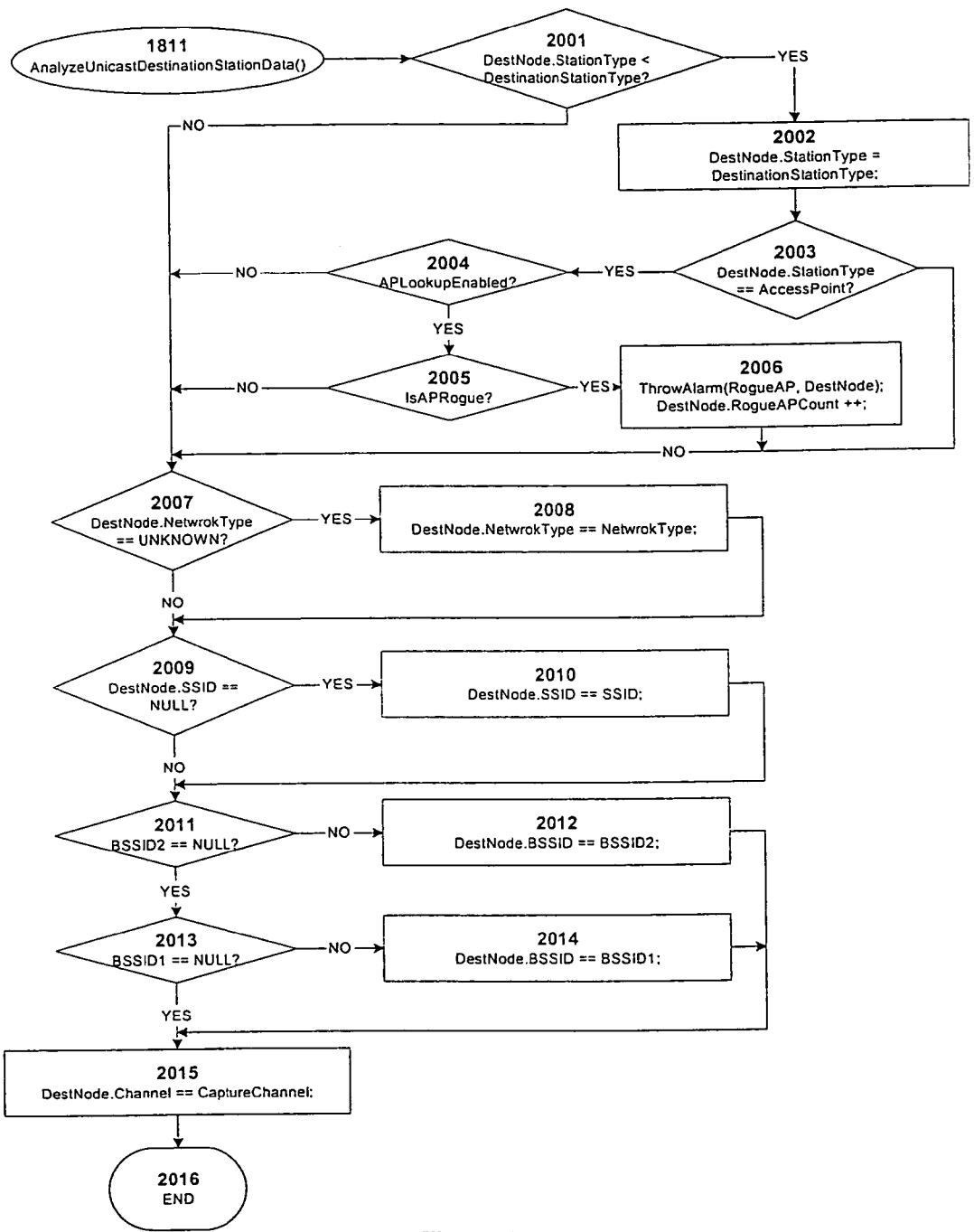
FIG. 20 shows the flowchart of a subroutine for step 1811 of FIG. 18, for analyzing in detail the data related to the unicast destination stations.

If the result of step 1807 is "No", the routine proceeds to step 1811 to execute the AnalyzeUnicastDestinationStationData( ) routine in order analyze the data related to the destination station types that have unicast addresses as described in greater detail by the flowchart of FIG. 20. The routine then proceeds to step 1812 where the AnalyzeDestinationNodeData routine terminates.

Figure 19:
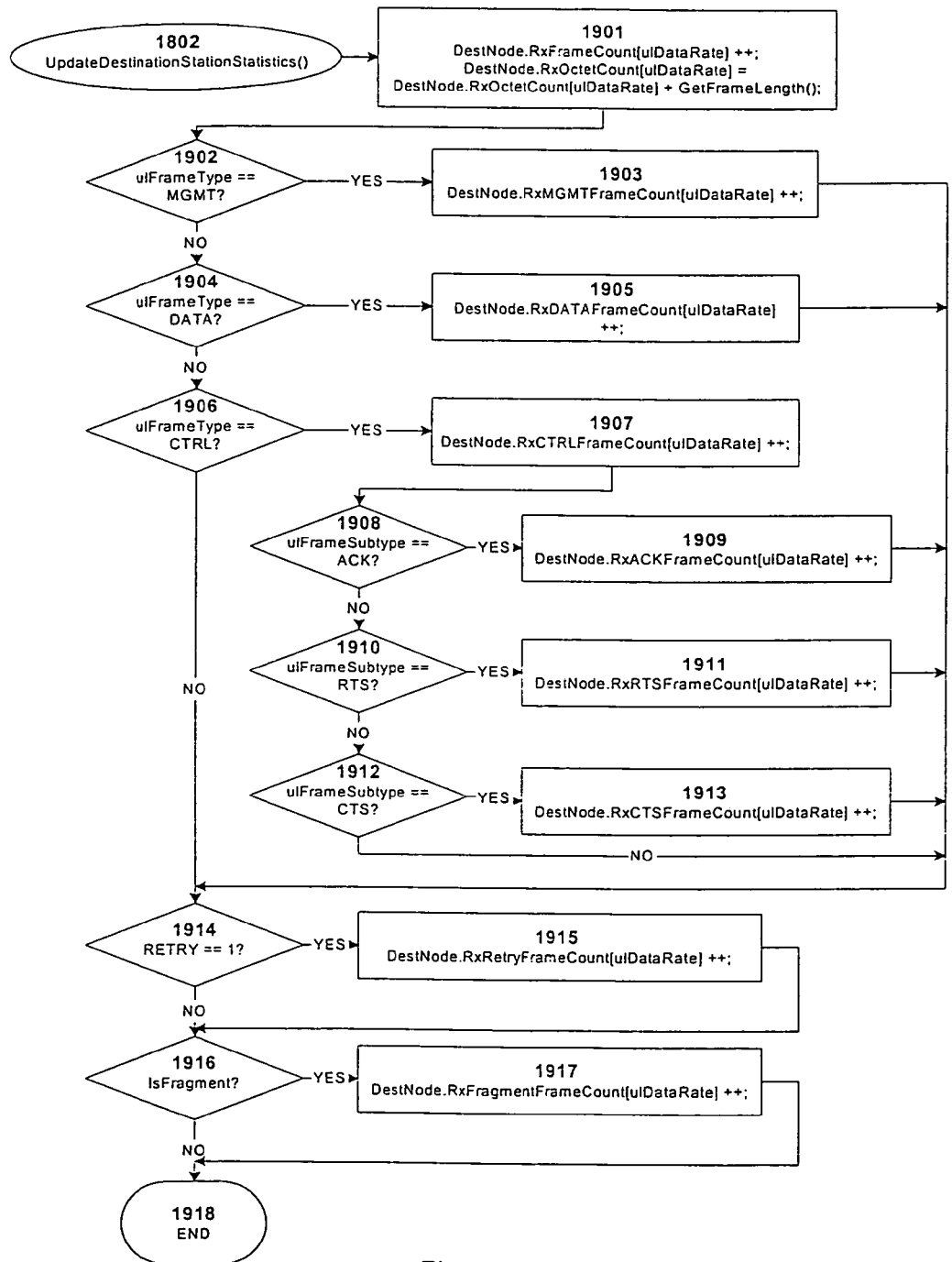
FIG. 19 shows the flowchart of a subroutine for step 1802 of FIG. 18, for updating the statistics related to the destination stations.

With reference to FIG. 19, the program executes the UpdateDestinationStationStatistics( ) routine (step 1802 of FIG. 18) as denoted by the steps 1901 to 1918. The role of this routine is to update the statistics related to the Destination node. Upon initiation of step 1802, the UpdateDestinationStationStatistics( ) routine proceeds to step 1901 where it increments the variable DestNode.RxFrameCount[uilDataRate] by one. It also increments the DestNode.RxOctetCount[ulDataRate] by the number of octets in the current frame. The routine then proceeds to step 1902 to determine if the frame type is a management frame. If "Yes" the routine proceeds to step 1903 to increment the variable DestNode.RxMGMTFrameCount[ulDataRate] by one. The routine then proceeds to step 1914.

If the result of the step 1902 is "No", the routine then proceeds to step 1904 to determine if the frame type is a data frame. If Yes" the routine proceeds to step 1905 to increment the variable DestNode.RxDATAFrameCount[ulDataRate] by one. The routine then proceeds to step 1914.

If the result of the step 1904 is "No", the routine then proceeds to step 1906 to determine if the frame type is a control frame. If "Yes", the routine proceeds to step 1907 to increment the variable DestNode.RxCTRLFrameCount[ulDataRate] by one. The routine then proceeds to step 1908 to determine if the frame subtype is an ACK frame. If "Yes", the routine proceeds to step 1909 to increment the variable DestNode.RxACKFrameCount[ulDataRate]. The routine proceeds to step 1914.

If the result of the step 1908 is "No", the routine then proceeds to step 1910 to determine if the frame subtype is an RTS frame. If "Yes", the routine proceeds to step 1911 to increment the variable DestNode.RxRTSFrameCount[ulDataRate]. The routine proceeds to step 1914.

If the result of the step 1910 is "No", the routine then proceeds to step 1912 to determine if the frame subtype is a CTS frame. If "Yes", the routine proceeds to step 1913 to increment the variable DestNode.RxCTSFrameCount[ulDataRate]. The routine then proceeds to step 1914. If the result of the step 1912 is "No", the routine then proceeds to step 1914. If the result of step 1906 is "No", the routine proceeds to step 1914 to determine if the "Retry" bit field 54 is set to one. If "Yes", the routine proceeds to step 1915 to increment the variable DestNode.RxRetryFrameCount[ulDataRate] by one. The routine then proceeds to step 1916.

If the result of step 1914 is "No", the routine proceeds to step 1916 to determine if the frame is a fragment of a larger frame. If "Yes", the routine proceeds to step 1917 to increment the variable DestNode.RxFragmentFrameCount[ulDataRate] by one. The routine then proceeds to termination step 1918. If the result of the step 1916 is "No", the routine proceeds to step 1918 where the UpdateDestinationStationStatistics( ) routine terminates.

With reference to FIG. 20, the program executes the AnalyzeUnicastDestinationStationData( ) routine (step 1811 of FIG. 18) as denoted by the steps 2001 to 2016. The role of this routine is to analyze the data related to the unicast destination node object. Upon initiation of step 1811, the AnalyzeUnicastDestinationStationData( ) routine proceeds to step 2001 to determine if the value of the variable DestNode.StationType is less than the value of the variable DestinationStationType. If "Yes", the routine proceeds to step 2002 to set the value of the variable DestNode.StationType to the value of the variable DestinationStationType determined by the previous flowcharts. The routine then proceeds to step 2003 to determine if the station type of the destination node object is equal to Access Point. If "Yes", the routine proceeds to step 2004 to determine if the access point is a rogue Access Point. The user enters the list of the known access points 14 in the network through the user interface shown in FIG. 31. The routine tests the newly discovered Access Point with respect to the Access Point list entered by the user. If it does not exit in the list, it is marked as a rogue Access Point. If the access point is a rogue Access Point at step 2005 the routine proceeds to step 2006 where it generates a Rogue Access Point Alarm. It also increments the variable DestNode.RogueAPCount by one. The routine proceeds to step 2007.

If the results of steps 2001, 2003, 2004 and 2005 are "No", the routine proceeds to step 2007 to determine if the network type of the destination station is unknown. If "Yes", the routine proceeds to step 2008 where the value of the variable DestNode.NetworkType is set to the value of the variable NetworkType as determined by the previous flowcharts. The routine then proceeds to step 2009.

If the result of step 2007 is "No", the routine proceeds to step 2009 to determine if the value of the variable DestNode.SSID is equal to null. If "Yes", the routine proceeds to step 2010 to set the value of the variable DestNode.SSID to the value of the variable SSID determined by the previous flowcharts. The routine then proceeds to step 2011.

If the result of step 2009 is "No", the routine proceeds to step 2011 to determine if the value of the variable BSSID2 is equal to null. If "No", the routine proceeds to step 2012 to set the value of the variable DestNode.BSSID to the value of the variable BSSID2. The routine proceeds to step 2015.

If the result of step 2011 is "Yes", the routine proceeds to step 2013 to determine if the value of the variable BSSID1 is equal to null. If "No", the routine proceeds to step 2014 to set the value of the variable DestNode.BSSID to the value of the variable BSSID1. The routine proceeds to step 2015.

If the result of step 2013 is "Yes", the routine proceeds to step 2015 to set the value of the variable DestNode.Channel to the value of the variable CaptureChannel determined by the previous flowcharts. The routine then proceeds to step 2016 where the AnalyzeUnicastDestinationStationData( ) routine terminates.

Figure 21:
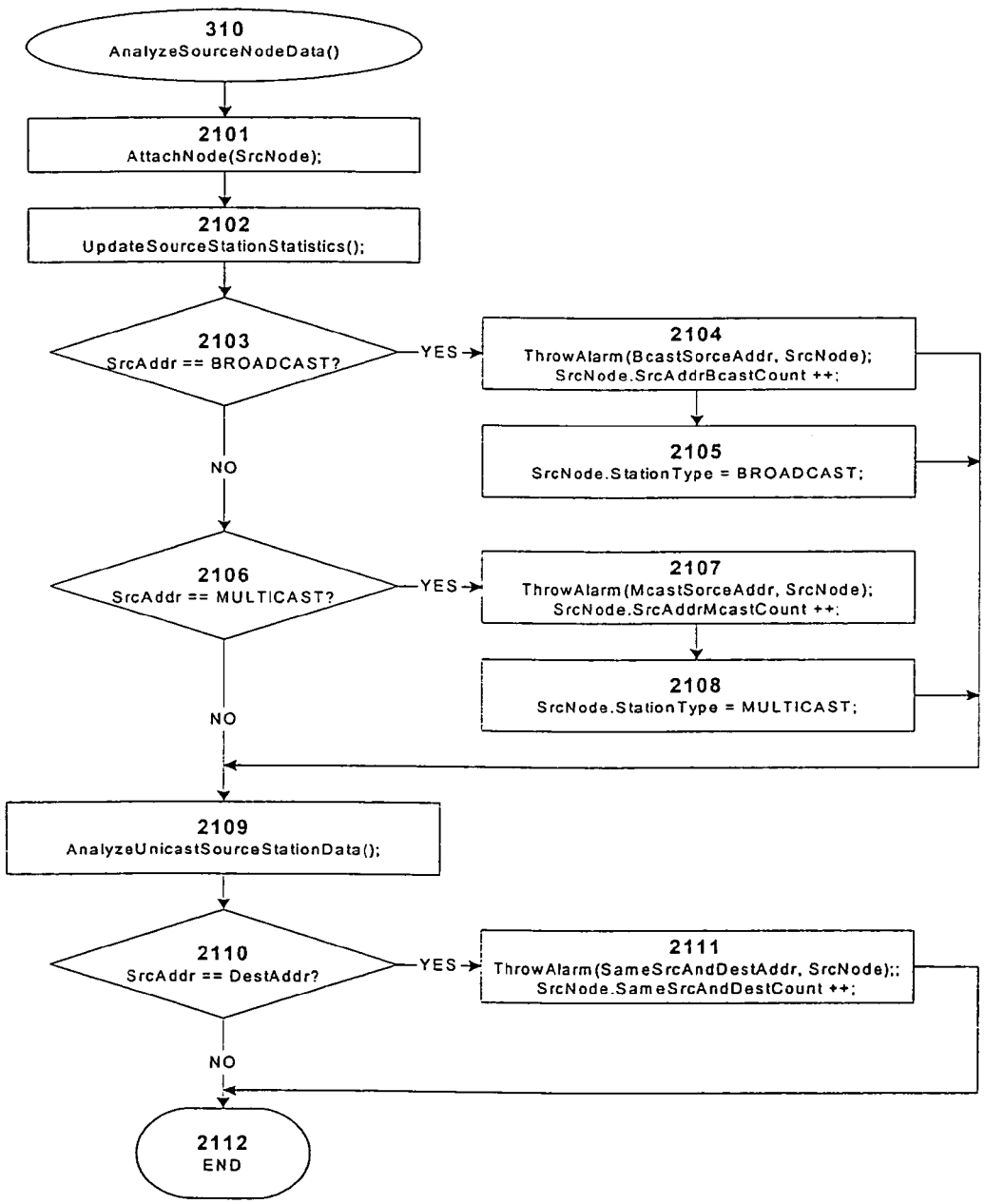
FIG. 21 shows the flowchart of a subroutine for step 310 of FIG. 3, for analyzing in detail the data related to the source stations or nodes.

With reference to FIG. 21, the program executes the AnalyzeSourceNodeData( ) routine (step 310 of FIG. 3) as denoted by the steps 2101 to 2112. The role of this routine is to analyze the data and parameters related to the Source Node Object Node. Upon initiation of step 310, the AnalyzeSourceNodeData( ) routine proceeds to step 2101 where it executes the AttachNode( ) function. The details of this function are beyond the subject of this invention. The AttachNode( ) function takes the Source Node Object as a parameter and attaches it to the link created between the wireless layer and higher protocol layers. The link between the wireless and higher layer protocols can be seen in the field 3014 of FIG. 30. The routine proceeds to step 2102 to execute the UpdateSourceStationStatistics( ) routine to update the frame and octet counts associated with the Source Node Object as described in greater detail by the flowchart of FIG. 22.

The routine then proceeds to step 2103 to determine if the source address is a broadcast address. If "Yes", the routine proceeds to step 2104 to generate a Broadcast source address alarm, because the Source address cannot be a Broadcast address. It also increments the variable SrcNode.SrcAddrBcastCount by one. The routine then proceeds to step 2105 where it sets the variable SrcNode.StationType to Broadcast. The routine proceeds to step 2109.

If the result of the step 2103 is "No", the routine then proceeds to step 2106 to determine if the source address is a Multicast address. If "Yes", the routine proceeds to step 2107 to generate a Multicast Source Address Alarm, because the Source address cannot be a Multicast address. It also increments the variable SrcNode.SrcAddrMcastCount by one. The routine then proceeds to step 2108 where it sets the variable SrcNode.StationType to Multicast. The routine proceeds to step 2109.

Figure 23:
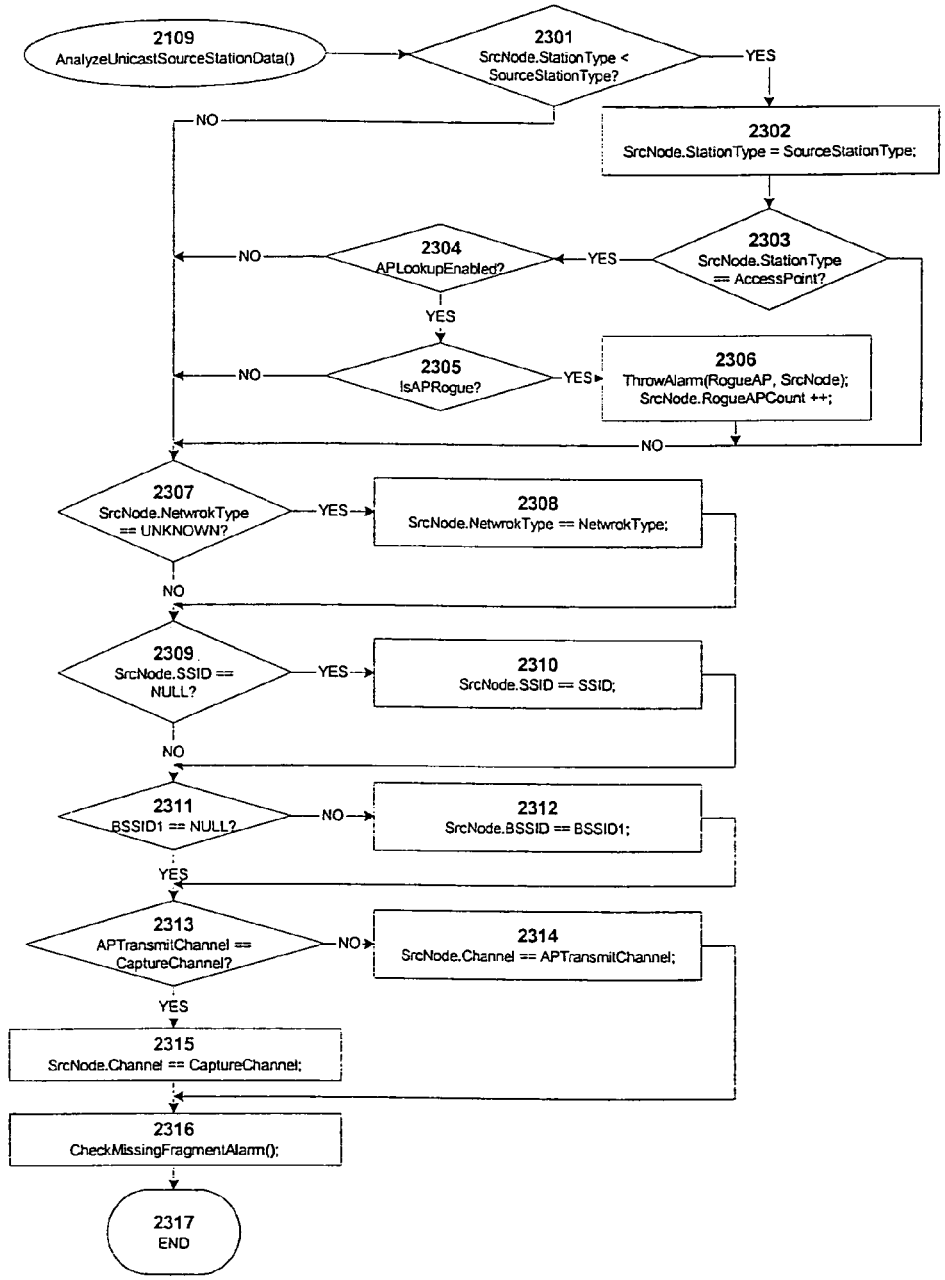
FIG. 23 shows the flowchart of a subroutine for step 2109 of FIG. 21, for analyzing in detail the data related to the unicast source stations.

If the result of step 2106 is "No", the routine proceeds to step 2109 to execute the AnalyzeUnicastSourceStation Data( ) routine in order to analyze the data related to the Source Station types that have unicast addresses as described in greater detail by the flowchart of FIG. 23. The routine then proceeds to step 2110 to determine if the Source and Destination addresses are equal to each other. If "Yes", the routine proceeds to step 2111 to generate a same Source and Destination address alarm. It also increments the variable SrcNode.SameSrcAndDestCount by one. The routine proceeds to termination of step 2112. If the result of the step 2110 is "No", the routine proceeds to step 2112 where the AnalyzeSourceNodeData( ) routine terminates.

Figure 22:
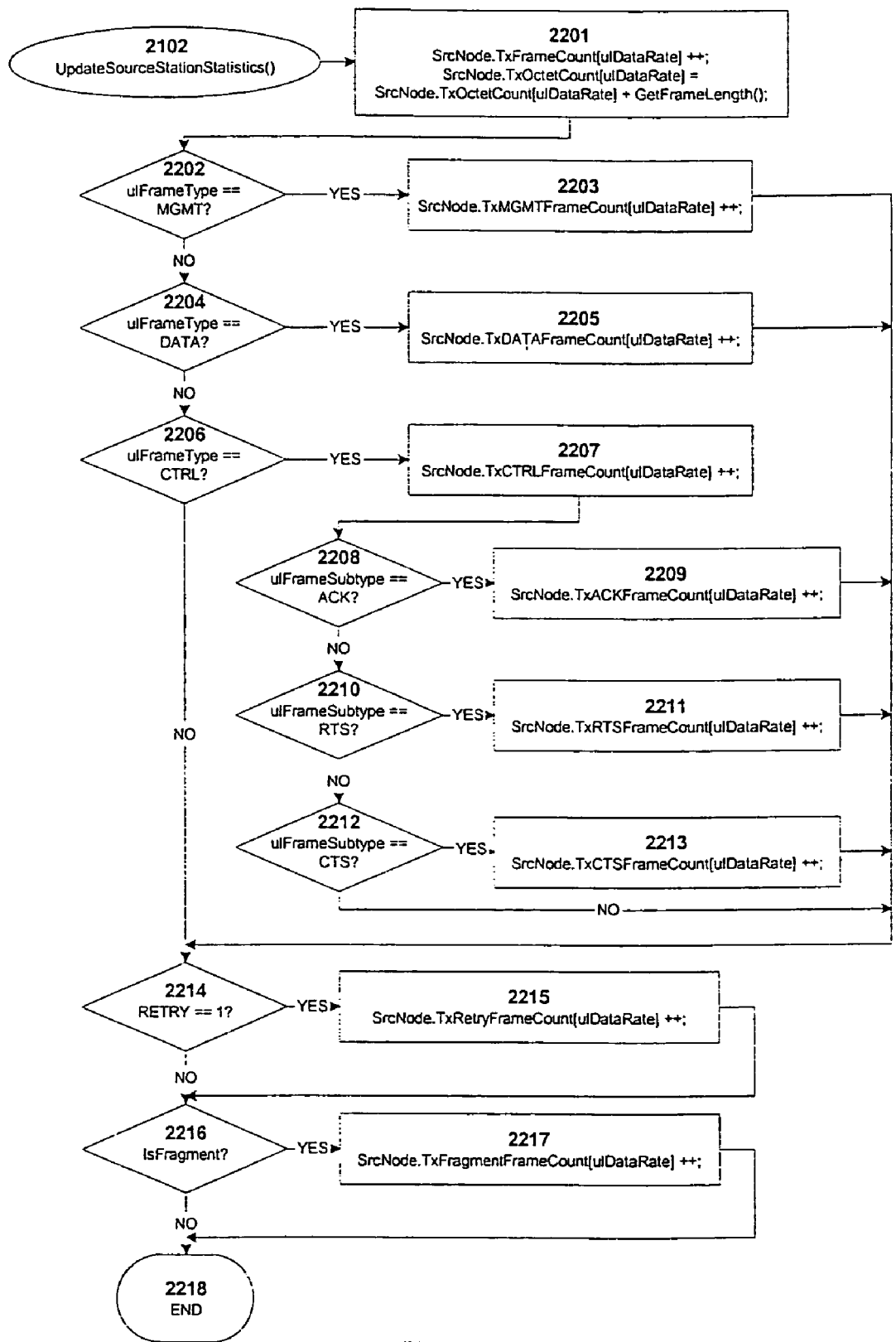
FIG. 22 shows the flowchart of a subroutine for step 2102 of FIG. 21, for updating the statistics related to the source stations.

With reference to FIG. 22, the program executes the UpdateSourceStationStatistics( ) routine (step 2102 of FIG. 21) as denoted by the steps 2201 to 2218. The role of this routine is to update the statistics related to the Source node. Upon initiation of step 2102, the UpdateSourceStationStatistics( ) routine proceeds to step 2201 where it increments the variable SrcNode.TxFrameCount[ulDataRate]by one. It also increments the SrcNode.TxOctetCount[ulDataRate] by the number octets in the current frame. The routine then proceeds to step 2202 to determine if the frame type is a Management frame. If "Yes" the routine proceeds to step 2203 to increment the variable ScrNode.TxMGMTFrameCount[ulDataRate] by one. The routine then proceeds to step 2214.

If the result of the step 2202 is "No", the routine then proceeds to step 2204 to determine if the frame type is a data frame. If "Yes," the routine proceeds to step 2205 to increment the variable SrcNode.TxDATAFrameCount[ulDataRate] by one. The routine then proceeds to step 2214.

If the result of the step 2204 is "No", the routine then proceeds to step 2206 to determine if the frame type is a control frame. If "Yes" the routine proceeds to step 2207 to increment the variable SrcNode.TxCTRLFrameCount[ulDataRate] by one. The routine then proceeds to step 2208 to determine if the frame subtype is an ACK frame. If "Yes", the routine proceeds to step 2209 to increment the variable SrcNode.TxACKFrameCount[ulDataRate]. The routine proceeds to step 2214.

If the result of the step 2208 is "No", the routine then proceeds to step 2210 to determine if the frame subtype is an RTS frame. If "Yes", the routine proceeds to step 2211 to increment the variable SrcNode.TxRTSFrameCount[ulDataRate]. The routine proceeds to step 2214.

If the result of the step 2210 is "No", the routine then proceeds to step 2212 to determine if the frame subtype is a CTS frame. If "Yes", the routine proceeds to step 2213 to increment the variable SrcNode.TxCTSFrameCount[ulDataRate]. The routine proceeds to step 2214. If the result of the step 2212 is "No", the routine then proceeds to step 2214. If the result of step 2206 is "No", the routine proceeds to step 2214 to determine if the "Retry" bit field 54 is set to one. If "Yes", the routine proceeds to step 2215 to increment the variable SrcNode.TxRetryFrameCount[ulDataRate] by one. The routine then proceeds to step 2216. If the result of step 2214 is "No", the routine proceeds to step 2216 to determine if the frame is a fragment of a larger frame. If "Yes", the routine proceeds to step 2217 to increment the variable SrcNode.TxFragmentFrameCount[ulDataRate] by one. The routine proceeds to termination step 1918. If the result of the step 2216 is "No", the routine proceeds to step 2218 where the UpdateSourceStationStatistics( ) routine terminates.

With reference to FIG. 23, the program executes the AnalyzeUnicastSourceStationData( ) routine (step 2109 of FIG. 21) as denoted by the steps 2301 to 2317. The role of this routine is to analyze the data related to the Unicast Source Node object. Upon initiation of step 2109, the AnalyzeUnicastSourceStationData( ) routine proceeds to step 2301 to determine if the value of the variable SrcNode.StationType is less than the value of the variable SourceStationType. If "Yes", the routine proceeds to step 2302 to set the value of the variable SrcNode.StationType to the value of the variable SourceStationType determined by the previous flowcharts. The routine then proceeds to step 2303 to determine if the station type of the Source Node object is equal to Access Point. If "Yes", the routine proceeds to step 2304 to determine if the Access Point is a Rogue Access Point. The user enters the list of the known access points 14 in the network through the user interface shown in FIG. 31. The routine tests the newly discovered Access Point with respect to the Access Point list entered by the user. If it is not in the list, it is marked as a Rogue Access Point. If the access point is a Rogue Access Point at step 2305, the routine proceeds to step 2306 where it generates a Rogue Access Point alarm. It also increments the variable SrcNode.RogueAPCount by one. The routine proceeds to step 2307.

If the results of steps 2301, 2303, 2304 and 2305 are "No", the routine proceeds to step 2307 to determine if the network type of the source station is unknown. If "Yes", the routine proceeds to step 2308 where the value of the variable SrcNode.NetworkType is set to the value of the variable NetworkType as determined by the previous flowcharts. The routine proceeds to step 2309. If the result of step 2307 is "No", the routine proceeds to step 2309 to determine if the value of the variable SrcNode.SSID is equal to null. If "Yes", the routine proceeds to step 2310 set the value of the variable SrcNode.SSID to the value of the variable SSID determined by the previous flowcharts. The routine proceeds to step 2311.

If the result of step 2309 is "No", the routine proceeds to step 2311 to determine if the value of the variable BSSID1 is equal to null. If "No", the routine proceeds to step 2312 to set the value of the variable SrcNode.BSSID to the value of the variable BSSID1. The routine proceeds to step 2313.

If the result of step 2311 is "Yes", the routine proceeds to step 2313 to determine if the value of the variable APTransmitChannel is equal to the value of the variable CaptureChannel. If "No", the routine proceeds to step 2314 to set the value of the variable SrcNode.Channel to the value of the variable APTransmitChannel. The routine proceeds to step 2316.

If the result of step 2313 is "Yes", the routine proceeds to step 2315 to set the value of the variable SrcNode.Channel to the value of the variable CaptureChannel determined by the previous flowcharts. The routine then proceeds to step 2316 to execute the CheckMissingFragmentAlarm( ) routine to check for missing fragment alarms object as described in greater detail by the flowchart of FIG. 24. The routine then proceeds to step 2317 where the AnalyzeUnicastSourceStationData( ) routine terminates.

Figure 24:
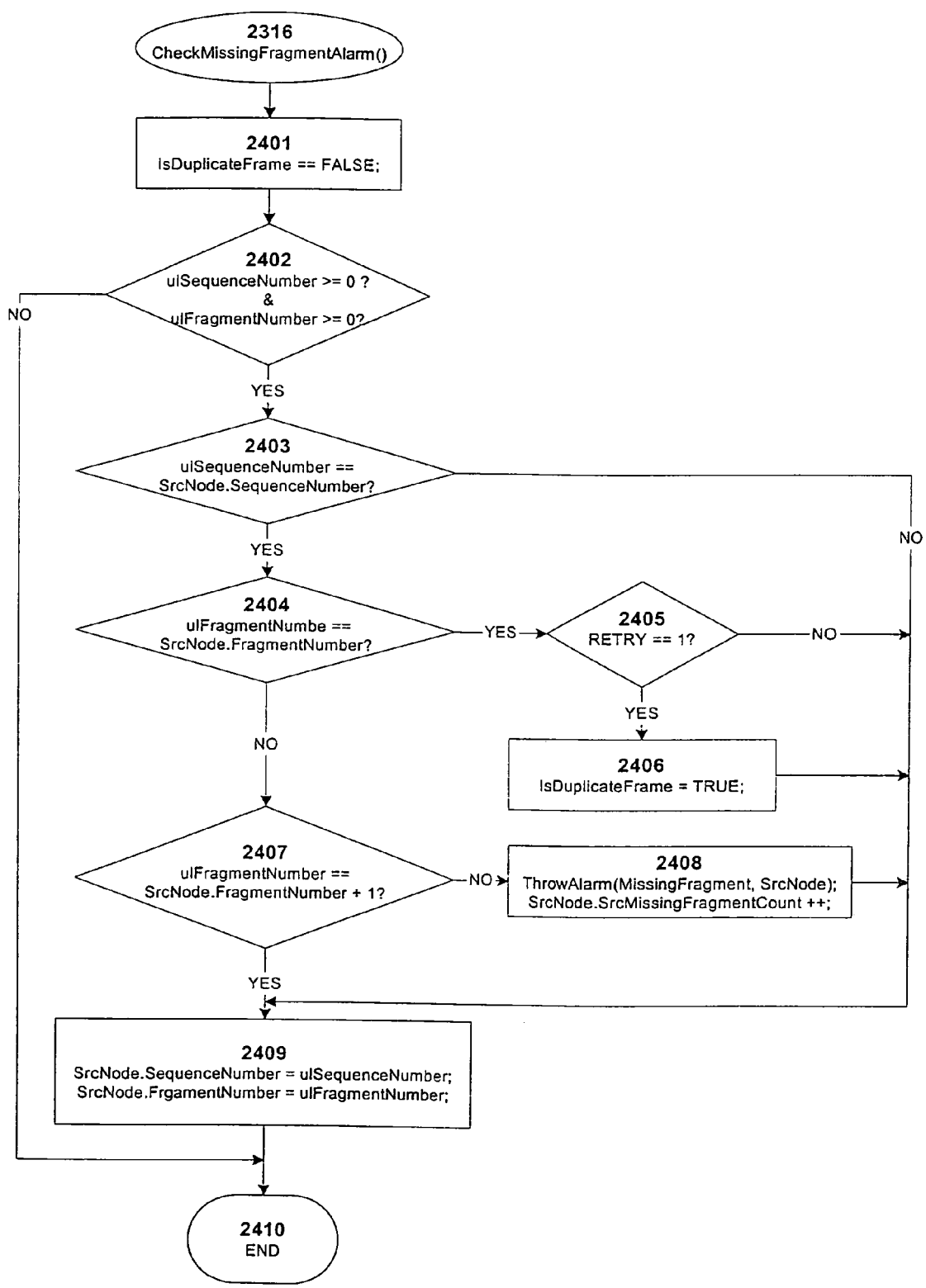
FIG. 24 shows the flowchart of a subroutine for step 2316 of FIG. 23, for checking alarms due to missing or delayed fragments of larger frames.

With reference to FIG. 24, the program executes the CheckMissingFragmentAlarm( ) routine (step 2316 of FIG. 23) as denoted by the steps 2401 to 2410. The role of this routine is to check for missing fragment alarms. Upon initiation of step 2316, the CheckMissingFragmentAlarm( ) routine proceeds to step 2401 where it initializes the variable IsDuplicateFrame to False. The routine proceeds to step 2402 to determine if the frame has valid sequence and fragment numbers. If "Yes", the routine proceeds to step 2403 to determine if the last sequence number used by the source station is the same as the sequence number of the current frame. If "Yes", the routine proceeds to step 2404 to determine if the last fragment number used by the source station is the same as the fragment number of the current frame. If "Yes", the routine proceeds to step 2405 to determine if the "Retry" bit field 54 is equal to one. If "Yes", the routine proceeds to step 2406 where the value of the variable IsDuplicateFrame is set to true. The routine then proceeds to step 2409. If the results of steps 2403 and 2405 are "No", the routine proceeds to step 2409.

If the result of step 2404 is "No", the routine proceeds to step 2407 to determine if the fragment number of the current frame is equal to one more than the last fragment number used by the source station. If "No", the routine proceeds to step 2408 to generate a missing fragment alarm. It also increments the variable SrcNode.SrcMissingFragmentCount by one. The routine then proceeds to step 2409. If the result of step 2407 is "Yes", the routine proceeds to step 2409 where it sets the values of the variables SrcNode.SequenceNumber and SrcNode.FragmentNumber, to the values of the variable ulSequenceNumber and ulFragmentNumber respectively. The routine proceeds to step 2410. If the result of step 2402 is "No", the routine proceeds to step 2410, where the CheckMissingFragmentAlarm( ) routine terminates.

Figure 25:
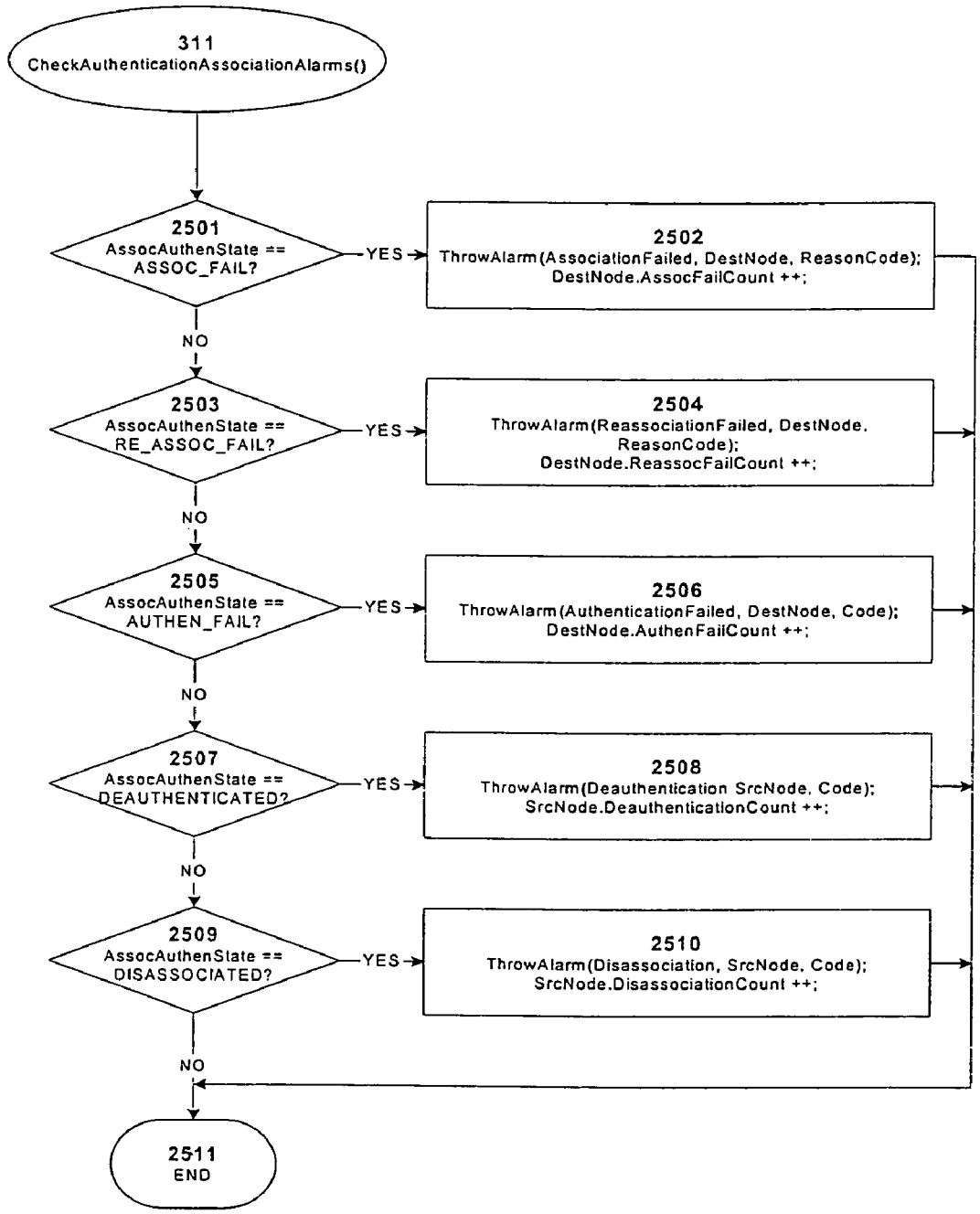
FIG. 25 shows the flowchart of a subroutine for step 311 of FIG. 3, for checking alarms related to authentication and association of stations.

With reference to FIG. 25, the program executes the CheckAuthenticationAssociationAlarms( ) routine (step 311 of FIG. 3) as denoted by the steps 2501 to 2511. The role of this routine is to check for alarms related to Authentication and Association. Upon initiation of step 311, the CheckAuthenticationAssociationAlarms( ) routine proceeds to step 2501 to determine if the value of the variable AssocAuthenState is equal to Association Failure. If "Yes", the routine proceeds to step 2502 where it generates an Association Failure alarm. It also passes the status code for Association Failure to the function that generates alarms. This status code is used as a parameter by the alarm system. The routine also increments the value of the variable DestNode.AssocFailCount by one. The routine proceeds to termination step 2511. If the result of step 2501 is "No", the routine proceeds to step 2503 to determine if the value of the variable AssocAuthenState is equal to Reassociation Failure. If "Yes", the routine proceeds to step 2504 where it generates a Reassociation Failure alarm. It also passes the status code for the reassociation failure to the function that generates alarms. This status code is used as a parameter by the alarm system. The routine also increments the value of the variable DestNode.ReassocFailCount by one. The routine proceeds to step 2511.

If the result of step 2503 is "No", the routine proceeds to step 2505 to determine if the value of the variable AssocAuthenState is equal to Authentication Failure. If "Yes", the routine proceeds to step 2506 where it generates an Authentication Failure alarm. It also passes the status code for the Authentication Failure to the function that generates alarms. This status code is used as a parameter by the alarm system. The routine also increments the value of the variable DestNode.AuthenFailCount by one. The routine proceeds to step 2511.

If the result of step 2505 is "No", the routine proceeds to step 2507 to determine if the value of the variable AssocAuthenState is equal to Deauthentication. If "Yes", the routine proceeds to step 2508 where it generates a Deauthentication alarm. It also passes the reason code for the Deauthentication to the function that generates alarms. This reason code is used as a parameter by the alarm system. The routine also increments the value of the variable DestNode.Deauthentication by one. The routine proceeds to step 2511.

If the result of step 2507 is "No", the routine proceeds to step 2509 to determine if the value of the variable AssocAuthenState is equal to Disassociation. If "Yes", the routine proceeds to step 2510 where it generates a Disassociation alarm. It also passes the reason code for the disassociation to the function that generates alarms. This reason code is used as a parameter by the alarm system. The routine also increments the value of the variable ScrNode.Disassociation by one. The routine proceeds to step 2511. If the result of step 2509 is "No", the routine proceeds to step 2511 where the CheckAuthenticationAssociationAlarms( ) routine terminates.

Although various embodiments of the invention have been shown and described, they are not meant to be limiting. Those of skill in the art may recognize certain modifications to these embodiments, which modifications are meant to be covered by the spirit and scope of the appended claims.

The invention claimed is:

1. A method, comprising:
identifying MAC addresses of known access points operating in an IEEE 802.11(b) wireless communication channel, wherein a user is permitted to enter the MAC addresses of known access points operating in the IEEE 802.11(b) wireless communication channel;
selectively activating a rogue access point detection routine;
establishing a wireless connection with a wireless communications network;
receiving wirelessly data packets or frames transmitted in the wireless communications network for stations or devices associated therewith;
performing over a first period of time a protocol analysis on contents of a header of the data packets or frames, including analyzing associated protocol layers;
checking addresses of detected access points against the MAC addresses of the known access points; and
displaying as a rogue access point, any access point detected that is not included as a known access point.

2. The method of claim 1, further comprising:
displaying results of the protocol analysis to the user.

3. The method of claim 1, further comprising:
storing in a memory storage device, the data packets or frames captured over a second period of time; and
performing an offline analysis on the contents of the header of the data packets or frames captured over the second period of time, and associated protocol layers of the data packets or frames captured over the second period of time, stored in the memory storage device; and
displaying results of the offline analysis to the user.

4. The method of claim 1, further comprising:
selectively turning the protocol analysis on or off for a particular protocol layer, whereby for a protocol layer turned off, that layer and all protocol layers above or higher than that layer are not subjected to the protocol analysis.

5. The method of claim 1, wherein the performing the protocol analysis comprises generating alarms for display relating to detected network and protocol errors.

6. The method of claim 5, wherein the performing the protocol analysis further comprises selectively turning on or off the alarm generating.

7. The method of claim 5, wherein the performing the protocol analysis further comprises:
assigning a default severity level from a plurality of available severity levels for each available alarm; and
selectively determining whether a particular alarm type is to be logged when generated.

8. The method of claim 7, further comprising selectively marking an alarm as a diagnosis or a symptom dependent upon a detected severity level.

9. The method of claim 2, wherein the displaying comprises showing all layers of protocols analyzed for the data packets or frames.

10. The method of claim 9, wherein the displaying further comprises:
showing a total number of frames and octets analyzed for a selected protocol layer.

11. The method of claim 9, wherein the displaying comprises showing for a selected protocol layer, lower layer objects linked to a current selected object.

12. The method of claim 9, wherein the displaying comprises showing hosts created for the IEEE 802.11(b) wireless communication channel, and attributes of the hosts, respectively.

13. The method of claim 12, further comprising showing statistics for each selected host.

14. The method of claim 12, further comprising showing the attributes for each selected host including MAC address, station function, frame types, channel, network types, BSSID, and SSID.

15. The method of claim 12, further comprising showing higher layer DLC objects linked to selected wireless layer hosts, respectively.

16. The method of claim 2, further comprising showing alarms associated with a selected host.

17. The method of claim 2, wherein the displaying comprises utilizing a plurality of viewing panes.

18. The method of claim 7, wherein, for each available alarm, the user is capable of assigning a severity level chosen from the plurality of available severity levels that is different from the default severity level.

19. A computer program product embodied on a computer readable storage medium executed by hardware, comprising:
computer code for identifying MAC addresses of known access points operating in an IEEE 802.11(b) wireless communication channel, wherein a user is permitted to enter the MAC addresses of known access points operating in the IEEE 802.11(b) wireless communication channel;
computer code for selectively activating a rogue access point detection routine;
computer code for establishing a wireless connection with a wireless communications network;
computer code for receiving wirelessly data packets or frames transmitted in the wireless communications network for stations or devices associated therewith;
computer code for performing over a first period of time a protocol analysis on contents of a header of the data packets or frames;
computer code for checking addresses of detected access points against the MAC addresses of the known access points; and
computer code for displaying information relating to a rogue access point detected that is not included as a known access point.

20. A system, comprising:
a network analyzer in communication with a network for identifying MAC addresses of known access points operating in an IEEE 802.11 (b) wireless communication channel, establishing a wireless connection with a wireless communications network, receiving wirelessly data packets or frames transmitted in the wireless communications network for stations or devices associated therewith, performing over a first period of time a protocol analysis on the contents of a header of the data packets or frames including analyzing associated protocol layers, checking addresses of detected access points against the MAC addresses of the known access points, and displaying as a rogue access point, any access point detected that is not included as a known access point, wherein a user is permitted to enter the MAC addresses of known access points operating in the IEEE 802.11(b) wireless communication channel.

* * * * *